United States Patent
Yamashita et al.

(10) Patent No.: US 9,762,165 B2
(45) Date of Patent: Sep. 12, 2017

(54) CONTROL DEVICE FOR ELECTRIC CAR

(75) Inventors: Yoshinori Yamashita, Chiyoda-ku (JP); Sho Kato, Chiyoda-ku (JP); Hisanori Yamasaki, Chiyoda-ku (JP); Ryo Yokozutsumi, Tokyo (JP); Yuruki Okada, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 39 days.

(21) Appl. No.: 14/419,407

(22) PCT Filed: Aug. 9, 2012

(86) PCT No.: PCT/JP2012/070297
§ 371 (c)(1),
(2), (4) Date: Feb. 3, 2015

(87) PCT Pub. No.: WO2014/024285
PCT Pub. Date: Feb. 13, 2014

(65) Prior Publication Data
US 2015/0194918 A1 Jul. 9, 2015

(51) Int. Cl.
*H02P 21/14* (2016.01)
*H02P 6/00* (2016.01)
(Continued)

(52) U.S. Cl.
CPC .......... *H02P 21/14* (2013.01); *B60L 3/0061* (2013.01); *B60L 3/04* (2013.01); *B60L 11/1803* (2013.01);
(Continued)

(58) Field of Classification Search
CPC .................. H02P 21/14; H02P 6/00
(Continued)

(56) References Cited

U.S. PATENT DOCUMENTS 5,859,521 A 1/1999 Tajima et al.
7,268,514 B2 * 9/2007 DeLange .............. B66B 5/0031
187/291

(Continued)

FOREIGN PATENT DOCUMENTS

JP 63-161802 A 7/1988
JP 4-008192 A 1/1992
(Continued)

OTHER PUBLICATIONS

Office Action (Notification of Reasons for Rejection) issued on Jan. 20, 2015, by the Japan Patent Office in corresponding Japanese Patent Application No. 2014-524199, and a Partial English Translation of the Office Action. (8 pages).
(Continued)

*Primary Examiner* — Kawing Chan
(74) *Attorney, Agent, or Firm* — Buchanan Ingersoll & Rooney PC

(57) ABSTRACT

A resistance calculation activator determines whether or not an electric car is stopped on the basis of a drive command signal and an external signal, and activates a resistance calculator if a powering command is input as the drive command when it is determined that the electric car is stopped. The activated resistance calculator computes, within a resistance calculation period, a resistance value of an AC motor that produces driving force for the electric car, on the basis of a d-axis voltage command value and a d-axis current value supplied to the AC motor.

2 Claims, 21 Drawing Sheets

(51) Int. Cl.
 *B60L 3/00* (2006.01)
 *B60L 3/04* (2006.01)
 *B60L 11/18* (2006.01)

(52) U.S. Cl.
 CPC ..... *B60L 2220/12* (2013.01); *B60L 2240/425* (2013.01); *B60L 2240/427* (2013.01); *B60L 2240/429* (2013.01); *Y02T 10/642* (2013.01); *Y02T 10/7005* (2013.01)

(58) Field of Classification Search
 USPC .............................. 318/400.02, 400.01, 700
 See application file for complete search history.

(56) References Cited

U.S. PATENT DOCUMENTS

| | | | | |
|---|---|---|---|---|
| 2009/0198427 | A1* | 8/2009 | Christopher Jackson | B60T 7/122 701/70 |
| 2011/0295479 | A1* | 12/2011 | Nodera | F02D 11/105 701/70 |
| 2012/0212163 | A1 | 8/2012 | Kono et al. | |

FOREIGN PATENT DOCUMENTS

| | | | |
|---|---|---|---|
| JP | 4-364384 | A | 12/1992 |
| JP | 5-260755 | A | 10/1993 |
| JP | 8-331899 | A | 12/1996 |
| JP | 9-135600 | A | 5/1997 |
| JP | 9-331700 | A | 12/1997 |
| JP | 2005-041384 | A | 2/2005 |
| JP | 2006-050872 | A | 2/2006 |
| JP | 3771239 | B2 | 4/2006 |
| JP | 2006-304509 | A | 11/2006 |
| JP | 2011064846 | A1 * | 6/2011 ............ B06L 15/025 |
| JP | 4738549 | B2 | 8/2011 |
| JP | 2012-105486 | A | 5/2012 |

OTHER PUBLICATIONS

International Search Report (PCT/ISA/210) mailed on Nov. 13, 2012, by the Japanese Patent Office as the International Searching Authority for International Application No. PCT/JP2012/070297.
Written Opinion (PCT/ISA/237) mailed on Nov. 13, 2012, by the Japanese Patent Office as the International Searching Authority for International Application No. PCT/JP2012/070297.
Notification of Reasons for Rejection mailed on Jul. 22, 2014, by the Japanese Patent Office for Application No. 2014-524199.
Sugimoto, Sogo Denshi Shuppan, Chapter 3: Power Conversion Circuits, Theory and Actual Design of AC Servo Systems, pp. 31-71.

* cited by examiner

CONTROL DEVICE FOR ELECTRIC CAR

TECHNICAL FIELD

The disclosure relates to a control device for an electric car that controls a power converter for driving an alternating current (AC) motor that produces driving power for a vehicle, and computes a resistance value of the AC motor.

BACKGROUND ART

The resistance value of an AC motor varies according to temperature. If the resistance value varies, and an error is produced between the resistance value configured on the control side and the actual resistance value, a desired output torque may not be obtained in some cases, and desired control response may not be obtained in some cases. Accordingly, it is necessary to accurately compute the resistance value of an AC motor.

With the technology disclosed in Patent Literature 1, a direct current (DC) voltage is applied and the current value is measured in a time of set length immediately after activation of an induction motor, and the variations of a primary resistance value and a secondary resistance value are computed on the basis of the measured current value and the current value at a standard temperature. With the induction motor control device disclosed in Patent Literature 2, test power is supplied to an inverter, the inverter is given a voltage command at a frequency so that a polyphase induction motor does not start to revolve, and a secondary resistance value is computed on the basis of a primary resistance value of the polyphase induction motor that is measured in advance.

With the technology disclosed in Patent Literature 1 and 2, a determination of whether or not the AC motor is revolving is not conducted. If the AC motor is revolving, the AC motor has complex impedance characteristics depending on the rotational frequency, and it is difficult to estimate a primary resistance value and a secondary resistance value from the response characteristics of the current value with respect to the voltage applied to the AC motor. For this reason, if the AC motor is revolving, accurately computing the primary resistance value and the secondary resistance value of the AC motor is difficult. Accordingly, the power conversion device disclosed in Patent Literature 3 computes the angular velocity of an AC motor on the basis of a drive command as well as the voltage and the current in a rotating coordinate system that rotates in synchronization with a rotating magnetic field produced in the AC motor, and computes the resistance value of the AC motor if the angular velocity is 0.

CITATION LIST

Patents Literature

Patent Literature 1: Unexamined Japanese Patent Application Kokai Publication No. H4-364384
Patent Literature 2: Japanese Patent No. 3771239
Patent Literature 3: Japanese Patent No. 4738549

SUMMARY OF INVENTION

Technical Problem

The power conversion device disclosed in Patent Literature 3 computes the resistance value of an AC motor when the angular velocity of the AC motor is 0, but strictly speaking, the angular velocity does not reach 0. For this reason, it is necessary to compute the resistance value of the AC motor by determining that the angular velocity is 0 if the angular velocity is within a set range that includes 0. Even if within the range, if the AC motor is revolving, it is difficult to accurately compute the primary resistance value and the secondary resistance value of the AC motor.

The present disclosure was devised in light of circumstances like the above, and an objective thereof is to improve the accuracy of computing the resistance value of an AC motor.

Solution to Problem

In order to achieve the above objective, a control device for an electric car according to the present disclosure is equipped with a power converter, a resistance calculator, and a resistance calculation activator. The power converter drives an AC motor that produces driving force for a vehicle. The resistance calculator computes a resistance value of the AC motor on the basis of the voltage command value and the current value. The resistance calculation activator activates the resistance calculator if a powering command is input as the drive command when it is determined that the AC motor has stopped revolving.

Advantageous Effects of Invention

According to the present disclosure, it becomes possible to improve the accuracy of computing the resistance value of an AC motor.

DESCRIPTION OF EMBODIMENTS

Figure 1:
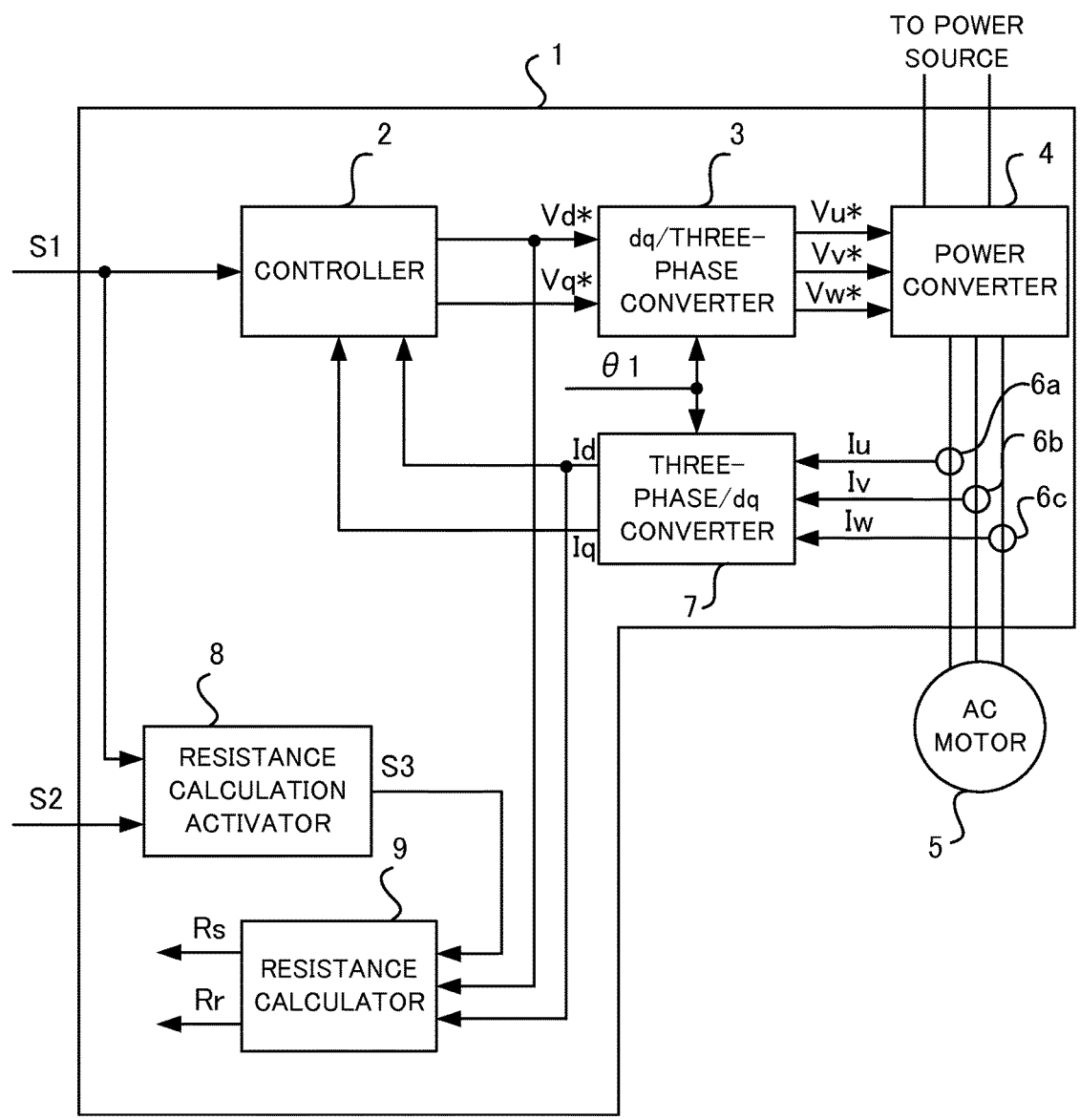
FIG. 1 is a block diagram illustrating an exemplary configuration of a control device for an electric car according to Embodiment 1 of the present disclosure.

Hereinafter, exemplary embodiments of the present disclosure will be described in detail and with reference to the drawings. Note that in the drawings, the same signs are given to the same or similar parts.

Embodiment 1

FIG. 1 is a block diagram illustrating an exemplary configuration of a control device for an electric car according to Embodiment 1 of the present disclosure. The control device 1 drives an AC motor 5 that produces driving force for a vehicle. The control device 1 is equipped with a controller 2, a direct-quadrature (dq)/three-phase converter 3, a power converter 4, an AC motor 5, current detectors 6a, 6b, and 6c, a three-phase/dq converter 7, a resistance calculation activator 8, and a resistance calculator 9 that computes the resistance value of the AC motor 5. A vehicle having the control device 1 and the AC motor 5 onboard is called an electric car, and the control device 1 is also called the control device for the electric car.

When using the control device 1 in an electric car, a drive command signal S1 is a command signal from a driver's cab. The content of the drive command signal S1 varies according to the driving operation conducted by the driver in the driver's cab. An external signal S2 is a signal used to control the electric car on the outside of the control device 1, and is a signal that may be used to determine whether or not the electric car is stopped. In the following description, a three-phase induction motor is used as the AC motor 5. Note that the present disclosure is also applicable to AC motors other than a three-phase induction motor.

The controller 2 uses technology of the related art as described in Patent Literature 3, for example, to generate a d-axis current command value Id* and a q-axis current command value Iq* in a rotating coordinate system on the basis of the drive command signal S1. The rotating coordinate is a coordinate that rotates in synchronization with a rotating magnetic field produced in the AC motor 5. The d-axis is the same direction as the main magnetic flux of the rotating magnetic field, while the q-axis is the direction orthogonal to the d-axis. As expressed in formula (1) below, the controller 2 generates and sends to the dq/three-phase converter 3 a d-axis voltage command value Vd* and a q-axis voltage command value Vq* that are command values of the voltage output by the power converter 4 in the rotating coordinate on the basis of the d-axis current command value Id*, the q-axis current command value Iq*, as well as the d-axis current value Id and the q-axis current value Iq output by the three-phase/dq converter 7, so as to eliminate the deviation between the d-axis current command value Id* and the d-axis current value Id, and the deviation between the q-axis current command value Iq* and the q-axis current value Iq. In formula (1) below, s is the differential operator.

[Math. 1]

$$Vd^* = k_{cp}\left(1 + \frac{\omega_{cpi}}{s}\right)(Id^* - Id) \qquad (1)$$
$$Vq^* = k_{cp}\left(1 + \frac{\omega_{cpi}}{s}\right)(Iq^* - Iq)$$

The proportional gain $k_{cp}$ and the time constant $\omega_{cpi}$ in formula (1) above are expressed in formula (2) below. In formula (2) below, $\omega_{cc}$ is a current response target value determined during designing the response of the d-axis current value Id and the q-axis current value Iq controlled by the controller 2, and is determined while also taking into account the carrier frequency of the power converter 4 (discussed later) and the required specifications for controlling the AC motor 5. For example, in the case of computing the resistance value of the AC motor 5 while the AC motor 5 has stopped revolving as in the present Embodiment 1, it is sufficient to configure approximately $\omega_{cpi}=500$ rad/s. Also, in formula (2) below, Ls is the primary inductance of the AC motor 5, and is the sum of the mutual inductance and the primary leakage inductance of the AC motor 5.

[Math. 2]

$$k_{cp} = \omega_{cc} \cdot Ls \qquad (2)$$
$$\omega_{cpi} = \frac{\omega_{cc}}{10}$$

The dq/three-phase converter 3 performs coordinate conversion of the d-axis voltage command value Vd* and the q-axis voltage command value Vq* from the rotating coordinate system to a driving coordinate system that is a coordinate for driving the AC motor 5, and generates and sends to the power converter 4 a voltage command value in the driving coordinate system. If the AC motor 5 is a three-phase induction motor, the driving coordinate is a three-phase coordinate having a U-phase axis, a V-phase axis, and a W-phase axis each having a mutual angular difference of 120 degrees. In the example of FIG. 1, the dq/three-phase converter 3 converts the coordinates of the d-axis voltage command value Vd* and the q-axis voltage command value Vq* in the rotating coordinate system to phase voltage command values Vu*, Vv*, and Vw*. The dq/three-phase converter 3 converts the coordinates of the d-axis voltage command value Vd* and the q-axis voltage command value Vq* by taking θ1 to be the phase of the d-axis with respect to the U-phase axis. The d-axis may be configured to an arbitrary direction, and the value of θ1 is a value that depends on the direction of the d-axis. The dq/three-phase converter 3 sends the phase voltage command values Vu*, Vv*, and Vw* to the power converter 4. The power converter 4, on the basis of the phase voltage values Vu*, Vv*, and Vw*, converts power input from a power source not illustrated into three-phase AC power to supply to the AC motor 5, and drives the AC motor 5.

The current detectors 6a, 6b, and 6c are current transformers (CTs) that detect a current value flowing through wiring between the power converter 4 and the AC motor 5. The current detectors 6a, 6b, and 6c respectively detect phase current values Iu, Iv, and Iw that the power converter 4 supplies to the AC motor 5, and send the detected values to the three-phase/dq converter 7. The current detectors 6a, 6b, and 6c are not limited to CTs. Also, since the phase current values satisfy the relationship Iu+Iv+Iw=0, the current detector 6c may be omitted, for example, and the phase current value Iw may be computed from the phase current values Iu and Iv respectively detected by the current detectors 6a and 6b. The three-phase/dq converter 7 converts the coordinates of the phase current values Iu, Iv, and Iw, and generates and sends the d-axis current value Id and the q-axis current value Iq in the rotating coordinate system to the controller 2 and the resistance calculator 9.

The resistance calculation activator 8 determines whether the AC motor 5 is revolving or has stopped revolving on the basis of the drive command signal S1 and the external signal S2, and if a powering command is input when it is determined that the AC motor 5 has stopped revolving, the resistance calculation activator 8 sends a resistance calculation signal S3 notifying the start of resistance calculation to the resistance calculator 9. The resistance calculation activator 8 determines whether or not the electric car is stopped on the basis of the drive command signal S1 and the external signal S2, and if a powering command is input as a drive command when it is determined that the electric car is stopped, the resistance calculation activator 8 decides a start time of a period in which resistance calculation is possible. The period in which resistance calculation is possible starts from the start time determined by the resistance calculation activator 8, and is called the resistance calculation period. The length of the resistance calculation period is determined during the design process. For example, the length of the resistance calculation period is set to 400 msec.

The resistance calculation signal S3 is a signal at sustained high (H) level during the resistance calculation period. The resistance calculation activator 8 activates the resistance calculator 9 by outputting the resistance calculation signal S3 at H level to the resistance calculator 9. Note that the resistance calculation activator 8 may also be configured to notify the resistance calculator 9 of the start time of the resistance calculation period, and the resistance calculator 9 may be configured to determine the end time of the resistance calculation period.

After being activated by the input of the resistance calculation signal S3 at H level, the resistance calculator 9 computes the resistance value of the AC motor 5 on the basis of the d-axis voltage command value Vd* and the d-axis current value Id in at least a partial period of the resistance calculation period. The resistance calculation period is a set period after the resistance calculator 9 is activated. Note that the method of computing the resistance value of the AC motor 5 is not limited to the example discussed above. It is sufficient for the resistance calculator 9 to compute the resistance value of the AC motor 5 using a voltage command value for the power converter 4 and a current value output by the power converter 4 during a set period after the resistance calculator 9 is activated. The resistance calculator 9 may also compute the resistance value of the AC motor 5 on the basis of the U-phase voltage command value Vu* and the U-phase current value Iu, for example.

The resistance calculator 9 uses technology of the related art as described in Patent Literature 2 and Patent Literature 3, for example, to compute a primary resistance value Rs and a secondary resistance value Rr of the AC motor 5. For example, in the case of applying a step voltage to the AC motor 5, during a time of predetermined length immediately after the start of the resistance calculation period, the resistance calculator 9 divides the d-axis voltage command value Vd* by the d-axis current value Id to compute the sum of the primary resistance value Rs and the secondary resistance value Rr. After the time of predetermined length elapses, the resistance calculator 9 divides the d-axis voltage command value Vd* by the d-axis current value Id to compute the primary resistance value Rs. Subsequently, the primary resistance value Rs is subtracted from the sum of the primary resistance value Rs and the secondary resistance value Rr to compute the secondary resistance value Rr. The time of predetermined length immediately after the start of the resistance calculation period is taken to be a time that is significantly shorter than the resistance calculation period, such as 50 msec, for example.

Figure 2:
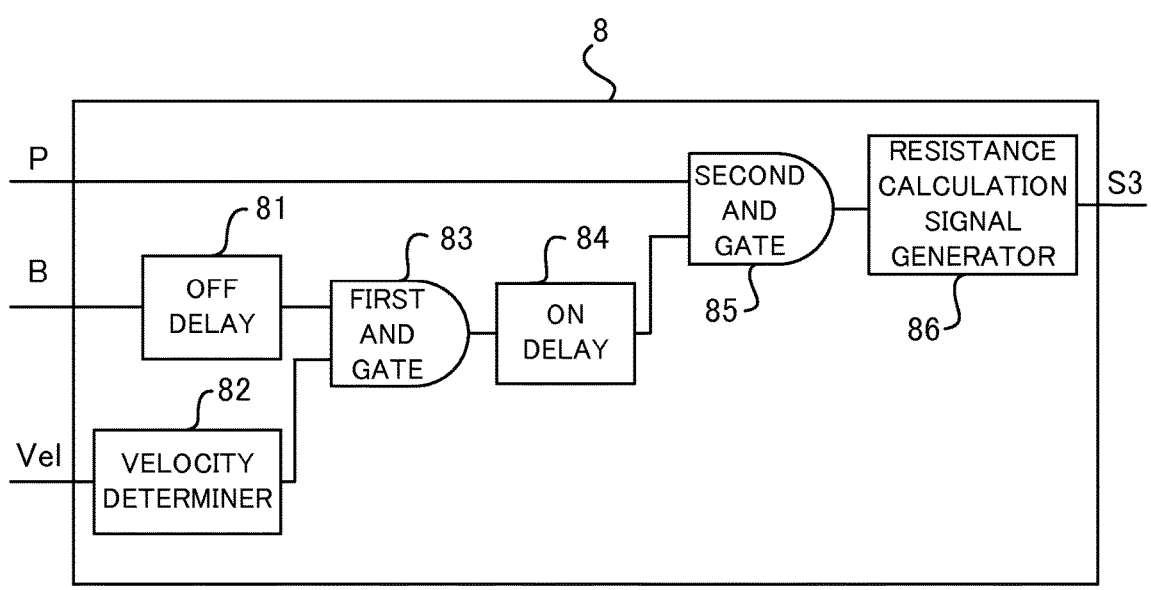
FIG. 2 is a block diagram illustrating an exemplary configuration of a resistance calculation activator according to Embodiment 1.

FIG. 2 is a block diagram illustrating an exemplary configuration of a resistance calculation activator according to Embodiment 1. A powering command signal P and a brake command signal B that are drive command signals S1, and a velocity signal Vel (discussed later) that is an external signal S2, are input into the resistance calculation activator 8. When the electric car may be determined to be stopped, if a powering command is input while a brake command is being input, or if a powering command is input in a predetermined period Ta that is a period of predetermined length starting after the brake command is released, the resistance calculation activator 8 outputs the resistance calculation signal S3 during the resistance calculation period starting from when the powering command is input. In this specification, "predetermined" means something that is determined in advance, or something that is expressed by a formula using a variable or the like, with a value that is determined before the value is used.

When a powering command is input as a drive command, the powering command signal P goes to H level, and when the powering command is released, the powering command signal P goes to low (L) level. Likewise, when a brake command is input as a drive command, the brake command signal B goes to H level, and when the brake command is released, the brake command signal B goes to L level.

The brake command signal B is input into an OFF delay 81. The OFF delay 81 detects the falling edge of the input signal, and outputs the falling edge after the predetermined period Ta elapses after detecting the falling edge. The length of the predetermined period Ta is a time determined on the basis of the time from when a brake command is released to when the braking force operating on the wheels of the electric car is released by operation of a mechanical brake device, and is set to 1 sec, for example.

Note that when the electric car is stopped at a station or the like, the power converter 4 does not operate, and in addition, the wheels of the electric car are locked by the mechanical brake device. When the brake command is released in such a state, the mechanical brake device releases the braking force operating on the wheels of the electric car. Since the release of braking force by the mechanical brake device accompanies mechanical operation, the braking force is gradually released. Since the wheels of the electric car are locked during the period in which at least some degree of braking force is applied on the wheels, the AC motor 5 may be determined to be stopped. The time required for such mechanical operation differs depending on the operating characteristics of the mechanical brake device, but generally is approximately 1 sec. In the present embodiment, the length of the predetermined period Ta is set to 1 sec as discussed above.

The velocity signal Vel is a signal that indicates the velocity of the electric car, and is input into a velocity determiner 82. For the velocity signal Vel, velocity information of an automatic train control (ATC) may be used, for example. The velocity determiner 82 determines whether or not the electric car is stopped, on the basis of whether or not the velocity of the electric car indicated by the velocity signal Vel is less than or equal to a predetermined threshold value. The velocity determiner 82 outputs a signal at H level in the case of being able to determine that the electric car is stopped, and at L level in the case of being unable to determine that the electric car is stopped.

Note that the velocity of the electric car indicated by the velocity signal Vel is computed by counting pulses output by a pulse generator (PG) attached to the axle of the electric car. The PG outputs a predetermined number of pulses for each revolution of the axle. A PG typically used in electric cars outputs approximately 10 pulses for each revolution of the axle. Since the velocity resolution is comparatively low for the electric car velocity computed according to the above calculation, if the AC motor 5 is in the process of stopping, or if the AC motor 5 is starting to revolve from a stopped state, it is difficult to accurately determine that the AC motor 5 has stopped revolving using only the velocity signal Vel.

A first AND gate 83 outputs the logical conjunction of the output of the OFF delay 81 and the output of the velocity determiner 82 to an ON delay 84. The ON delay 84 detects the rising edge of the input signal, and outputs the rising edge after a predetermined period Tb elapses after detecting the rising edge. Also, at the falling edge of the input signal, the ON delay 84 outputs the falling edge. The ON delay 84 is provided to remove noise and prevent chattering. For example, the length of the predetermined period Tb of the ON delay 84 is set to 5 sec.

A second AND gate 85 sends the logical conjunction of the powering command signal P and the output of the ON delay 84 to a resistance calculation signal generator 86. The resistance calculation signal generator 86, in the case of detecting the rising edge of the input signal, outputs the resistance calculation signal S3 at sustained H level during a resistance calculation period of predetermined length starting from the rising edge.

Figure 3:
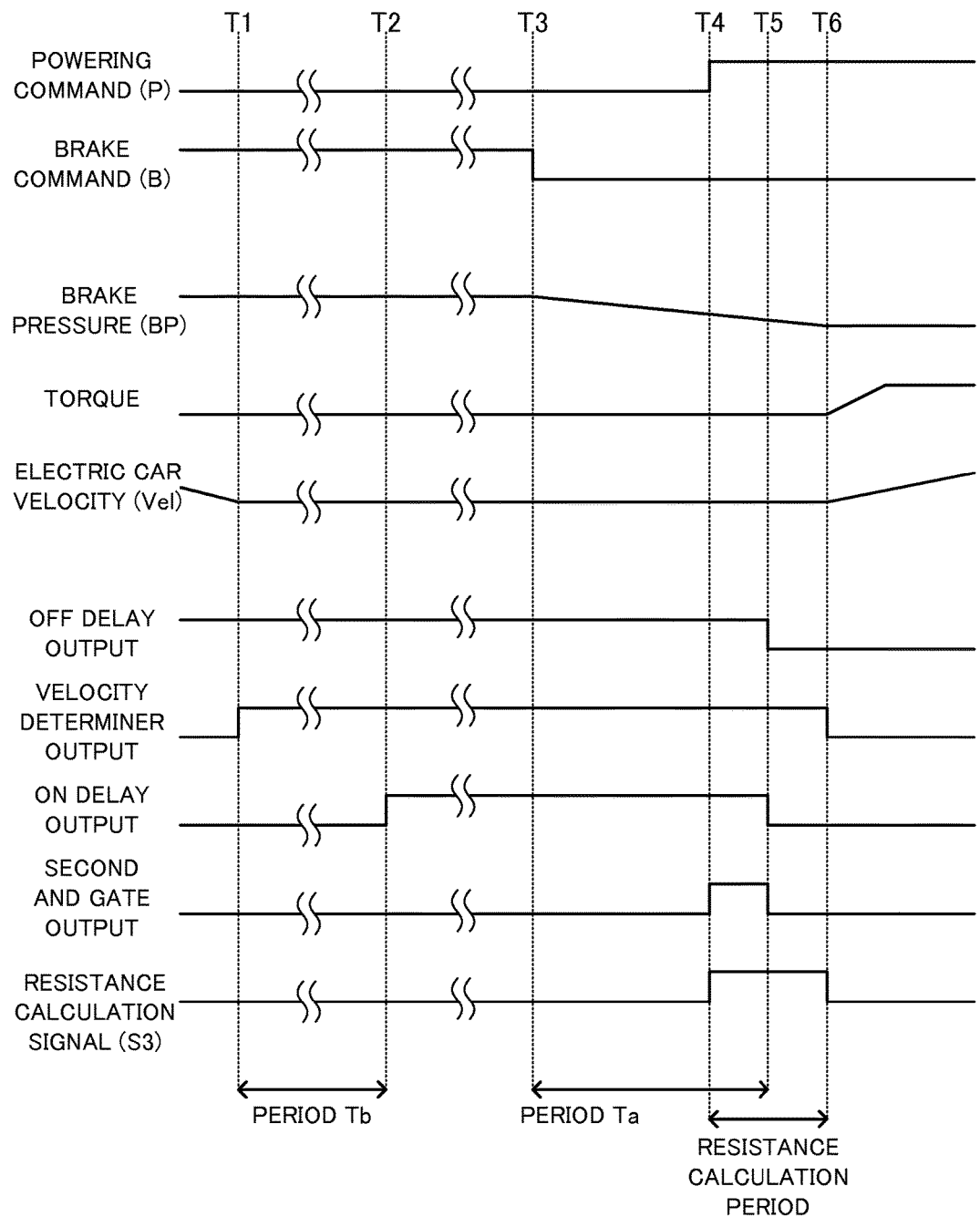
FIG. 3 is a timing chart for describing an operation of a resistance calculation activator according to Embodiment 1 determining a resistance calculation period.

FIG. 3 is a timing chart for describing an operation of a resistance calculation activator according to Embodiment 1 determining a resistance calculation period. FIG. 3 illustrates the input of the powering command and the release of the brake command, changes in the brake pressure of the electric car, the torque of the AC motor 5, and the velocity of the electric car, and changes in the inputs and outputs of predetermined elements provided in the resistance calculation activator 8. FIGS. 2 and 3 will be used to describe an operation of the resistance calculation activator 8 determining the resistance calculation period.

In the example of FIG. 3, the electric car velocity gradually decreases while the brake command is being input, and at time T1 enters a state in which the electric car may be determined to be stopped. After that, at time T3 the brake command is released, and at time T4 a powering command is input. After the brake command is released at time T3, the braking force gradually decreases. After the powering command is input at time T4 within the predetermined period Ta from time T3, if the torque starts to increase at time T6 when the resistance calculation period ends as discussed later, the AC motor 5 starts to revolve, the electric car begins to move, and the electric car velocity gradually increases.

The output of the OFF delay 81 goes to L level at time T5 after the predetermined period Ta elapses from time T3 when the brake command is released. During the period from when the electric car stops at time T1 to when the electric car begins to move at time T6, the value of the velocity signal Vel is less than or equal to a threshold value, and thus the output of the velocity determiner 82 is at H level from time T1 to time T6. The output of the first AND gate 83 is at H level from time T1 to time T5. The output of the ON delay 84 goes to H level at time T2 after the predetermined period Tb elapses from time T1, and goes to L level at time T5.

The powering command signal P goes to H level at time T4 when the powering command is input, and the output of the ON delay 84 is at H level from time T2 to time T5. Consequently, the output of the second AND gate 85 is at H level from time T4 to time T5. The resistance calculation signal S3 is at H level from time T4 until time T6 after the resistance calculation period elapses.

Even if the powering command is input at time T4 in a state in which the brake command is being input, similarly to the example discussed above, the resistance calculation activator 8 outputs a resistance calculation signal S3 at sustained H level during the resistance calculation period. This applies similarly to the embodiments hereinafter. As discussed above, by using the primary resistance value Rs and the secondary resistance value Rr computed when the AC motor 5 is determined to be stopped, a more stable desired output torque of the AC motor 5 may be obtained.

As described above, in Embodiment 1, a powering command signal P, a brake command signal B, and a velocity signal Vel indicating the velocity of the electric car are used to determine whether or not the AC motor 5 has stopped revolving, and a resistance value of the AC motor 5 is computed while the AC motor 5 has stopped revolving. Consequently, it becomes possible to improve the accuracy of computing the resistance value. In addition, since it is not necessary to provide a velocity calculator that detects the angular velocity of the AC motor 5 in order to determine whether or not the AC motor 5 has stopped revolving, simplifying the configuration becomes possible.

Embodiment 2

Figure 4:
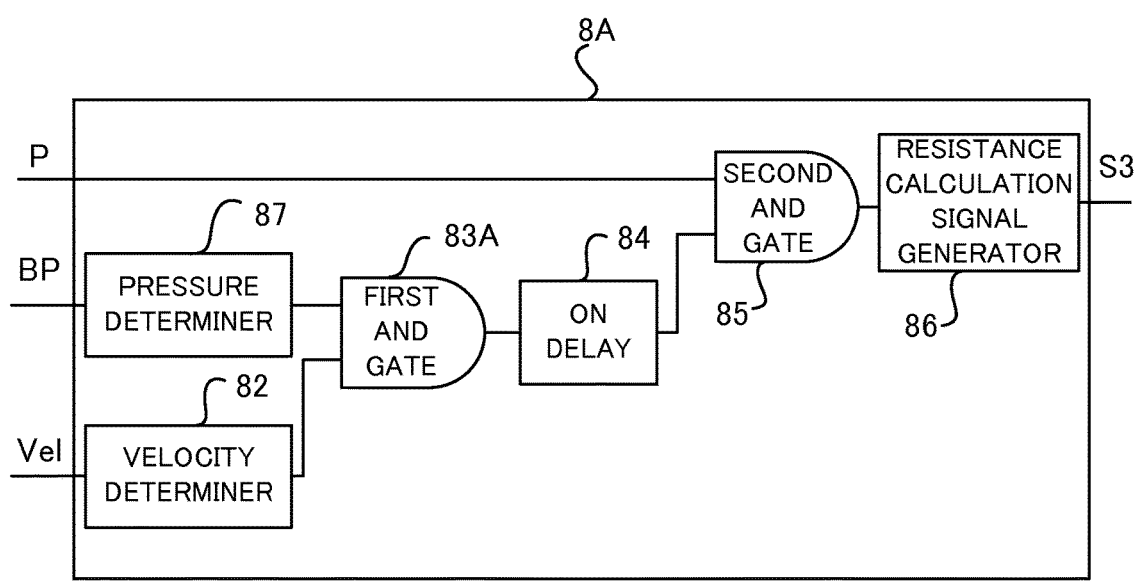
FIG. 4 is a block diagram illustrating an exemplary configuration of a resistance calculation activator according to Embodiment 2 of the present disclosure.

FIG. 4 is a block diagram illustrating an exemplary configuration of a resistance calculation activator according to Embodiment 2 of the present disclosure. The resistance calculation activator 8A according to Embodiment 2 determines whether or not the AC motor 5 has stopped revolving, on the basis of the powering command signal P that is a drive command signal S1, as well as the velocity signal Vel and a brake pressure signal BP that are external signals S2. When the electric car may be determined to be stopped and the brake pressure is less than or equal to a threshold value, if a powering command is input while a brake command is being input, or if a powering command is input in a period during which the brake pressure is equal to or greater than a predetermined value after the brake command is released, the resistance calculation activator 8A determines the start time of the resistance calculation period. Within at least the resistance calculation period after a powering command is input while in the above state, the AC motor 5 may be determined to have stopped revolving, and computing the resistance value of the AC motor 5 is possible. The resistance calculation activator 8A according to Embodiment 2 is equipped with a pressure determiner 87 instead of the OFF delay 81 provided in the resistance calculation activator 8 according to Embodiment 1.

The brake pressure signal BP is a signal that indicates the brake pressure, and is input into the pressure determiner 87. The pressure determiner 87 determines whether or not the brake pressure is equal to or greater than a threshold value. For example, suppose that the pressure determiner 87 outputs a signal at H level when the brake pressure is equal to or greater than the threshold value, and at L level when the brake pressure is less than the threshold value. A first AND gate 83A outputs the logical conjunction of the output of the pressure determiner 87 and the output of the velocity determiner 8 to the ON delay 84.

Figure 5:
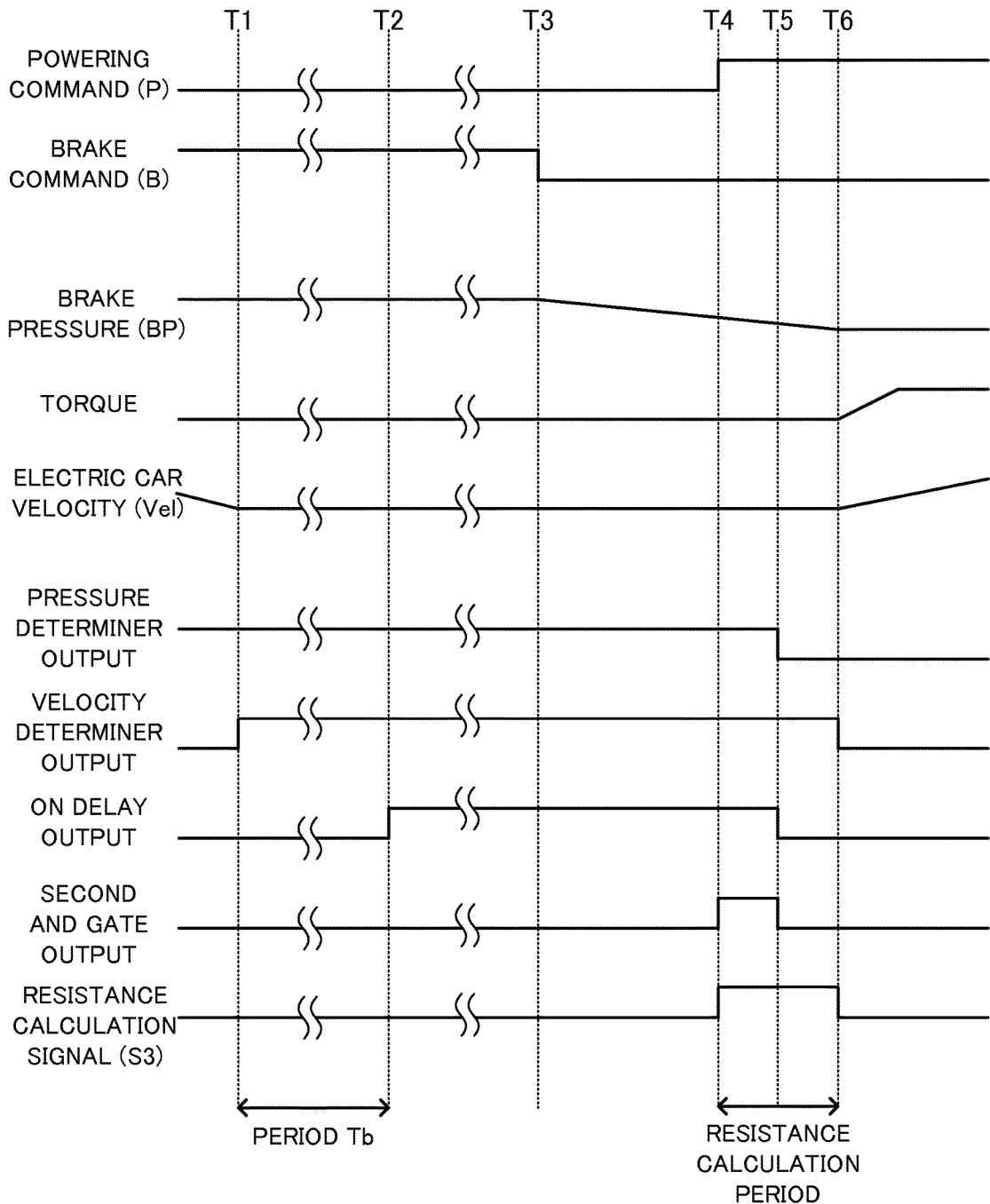
FIG. 5 is a timing chart for describing an operation of a resistance calculation activator according to Embodiment 2 determining a resistance calculation period.

FIG. 5 is a timing chart for describing an operation of a resistance calculation activator according to Embodiment 2 determining a resistance calculation period. FIGS. 4 and 5 will be used to describe an operation of the resistance calculation activator 8A determining the resistance calculation period. The times when the powering command is input and the brake command is released, as well as the changes in the brake pressure, the torque of the AC motor 5, and the electric car velocity are similar to Embodiment 1.

When the brake pressure becomes less than the threshold value at time T5 after time T4 when the powering command is input, the output of the pressure determiner 87 goes to L level at time T5. The operation of the velocity determiner 82 is similar to Embodiment 1. The output of the first AND gate 83A is at H level from time T1 to time T5, similarly to Embodiment 1. The operation of the ON delay 84, the second AND gate 85, and the resistance calculation signal generator 86 is similar to Embodiment 1. The resistance calculation signal S3 is at H level from time T4 until time T6 after the resistance calculation period elapses.

As described above, in Embodiment 2, a powering command signal P, a brake pressure signal BP, and a velocity signal Vel indicating the velocity of the electric car are used to determine whether or not the AC motor 5 has stopped revolving, and a resistance value of the AC motor 5 is computed when the AC motor 5 has stopped revolving. Consequently, it becomes possible to improve the accuracy of computing the resistance value.

Embodiment 3

Figure 6:
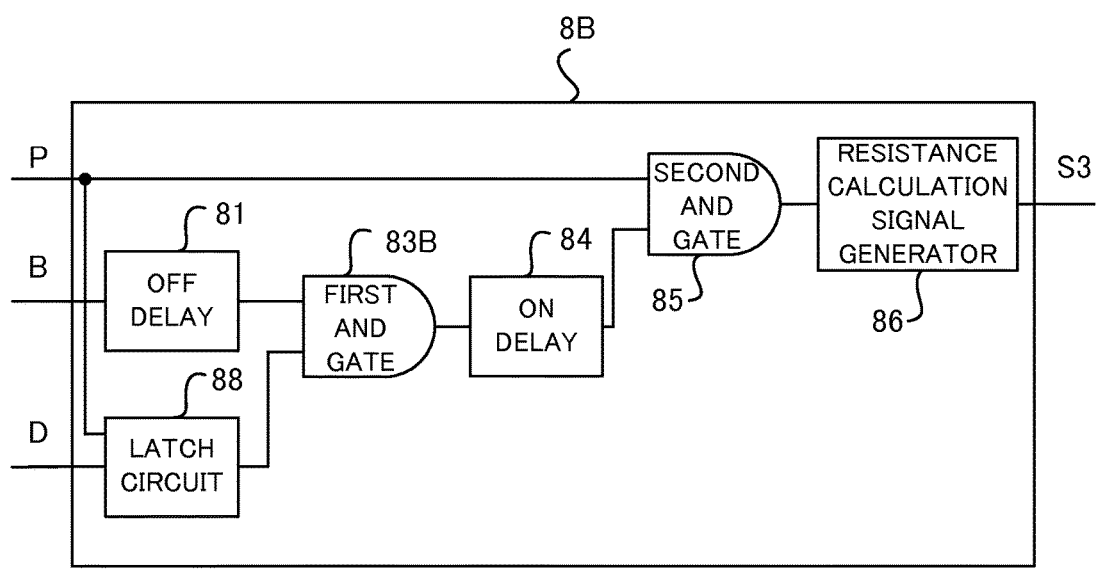
FIG. 6 is a block diagram illustrating an exemplary configuration of a resistance calculation activator according to Embodiment 3 of the present disclosure.

FIG. 6 is a block diagram illustrating an exemplary configuration of a resistance calculation activator according to Embodiment 3 of the present disclosure. The resistance calculation activator 8B according to Embodiment 3 determines whether or not the AC motor 5 has stopped revolving, on the basis of the powering command signal P and the brake command signal B that are drive command signals S1, as well as a door open/close signal D that is an external signal S2. After the door of the electric car opens and then closes, if a powering command is input while a brake command is being input, or if a powering command is input within the predetermined period Ta after the brake command is released, the resistance calculation activator 8B determines the start time of the resistance calculation period. The resistance calculation activator 8B according to Embodiment 3 is equipped with a latch circuit 88 instead of the velocity determiner 82 provided in the resistance calculation activator 8 according to Embodiment 1.

The door open/close signal D input into the latch circuit 88 is a signal at H level when the door is open, and at L level when the door is closed. The latch circuit 88 outputs the signal at H level when the input door open/close signal D is at H level, outputs the signal at L level when the input powering command signal P is at H level, and holds the output state when the door open/close signal D and the powering command signal P are both at L level. Note that the door open/close signal D and the powering command signal P are never at H level simultaneously. A first AND gate 83B outputs the logical conjunction of the output of the OFF delay 81 and the output of the latch circuit 88 to the ON delay 84.

Figure 7:
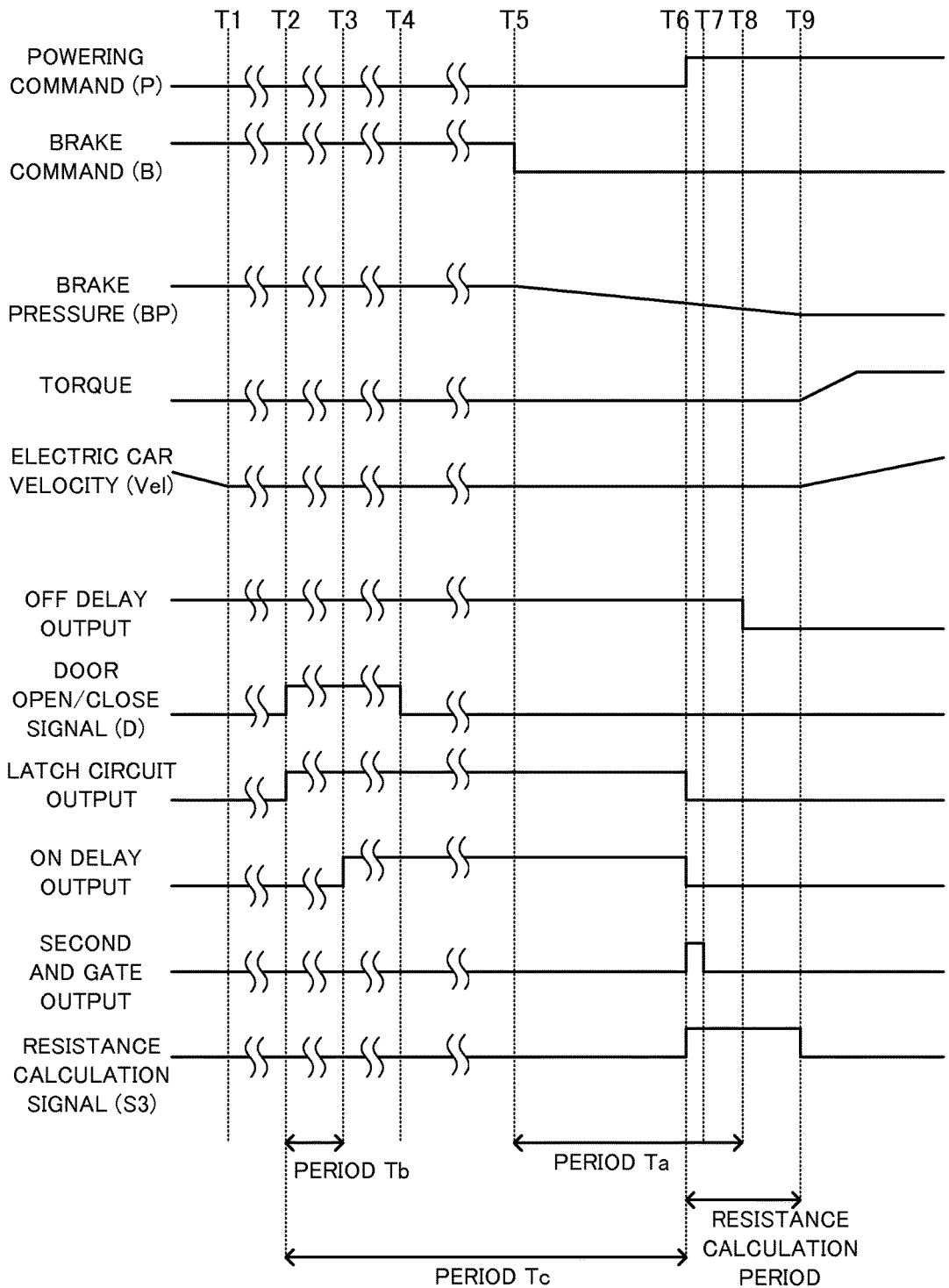
FIG. 7 is a timing chart for describing an operation of a resistance calculation activator according to Embodiment 3 determining a resistance calculation period.

FIG. 7 is a timing chart for describing an operation of a resistance calculation activator according to Embodiment 3 determining a resistance calculation period. In the example of FIG. 7, the brake command is released at time T5, and the powering command is input at time T6 that is within the predetermined period Ta from time T5. After the brake command is released at time T5, the brake pressure gradually decreases. After the powering command is input at time T6, if the torque starts to increase at time T9, the AC motor 5 starts revolving, the electric car begins to move, and the electric car velocity gradually increases. FIGS. 6 and 7 will be used to describe an operation of the resistance calculation activator 8B determining the resistance calculation period.

In the example of FIG. 7, the door opens at time T2, and the door closes at time T4. The output of the latch circuit 88 is at H level during a period Tc from time T2 when the door opens until time T6 when the powering command signal P rises. Although the door closes at time T4 included in the period Tc, the output of the latch circuit 88 is held at H level during the period from time T4 to time T6.

The operation of the OFF delay 81 is similar to Embodiment 1. The output of the OFF delay 81 goes to L level at time T8. The output of the first AND gate 83B is at H level from time T2 to time T6. The operation of the ON delay 84, the second AND gate 85, and the resistance calculation signal generator 86 is similar to Embodiment 1. The output of the ON delay 84 goes to H level at time T3 after the predetermined period Tb elapses from time T2 when the output of the first AND gate 83B goes to H level, and the output of the ON delay 84 goes to L level at time T6.

Because of the control period, the output of the ON delay 84 does not actually go to L level at time T6, and the output of the second AND gate 85 is at H level from time T6 until time T7 after a predetermined control period. The predetermined control period is a period over which each element of the resistance calculation activator 8B, including the second AND gate 85, repeats control operation, and is a length of time determined during the design process. The resistance calculation signal S3 is at H level from time T6 until time T9 after the resistance calculation period elapses. In order to make the H level period of the output of the second AND gate 85 sufficiently long, the powering command signal P may be configured to be input into the latch circuit 88 via an ON delay.

As described above, in Embodiment 3, a powering command signal P, a brake command signal B, and a door open/close signal D are used to determine whether or not the AC motor 5 has stopped revolving, and a resistance value of the AC motor 5 is computed when the AC motor 5 has stopped revolving. Consequently, it becomes possible to improve the accuracy of computing the resistance value.

Embodiment 4

Figure 8:
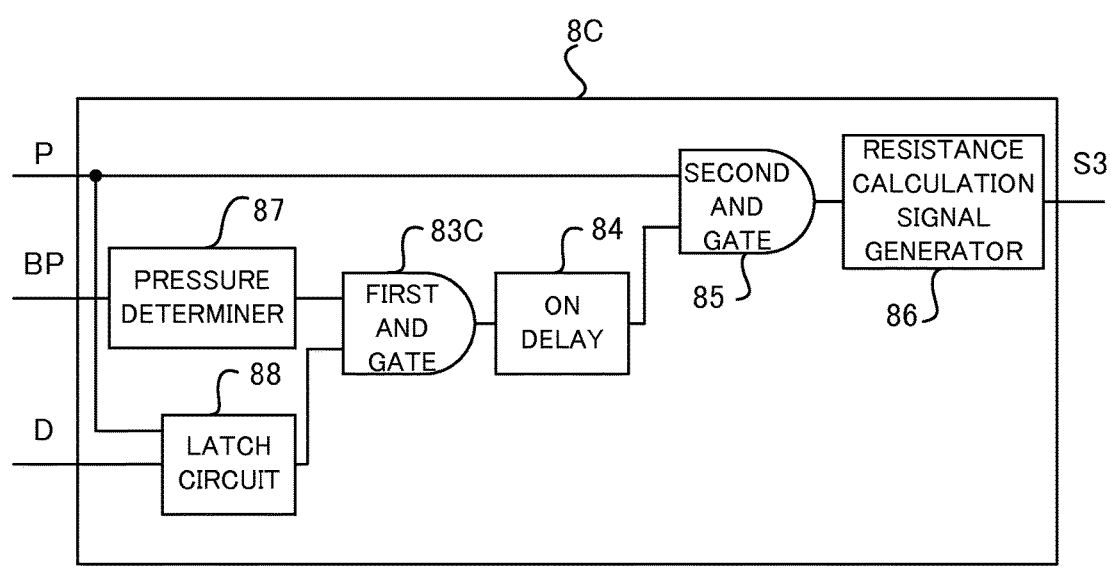
FIG. 8 is a block diagram illustrating an exemplary configuration of a resistance calculation activator according to Embodiment 4 of the present disclosure.

FIG. 8 is a block diagram illustrating an exemplary configuration of a resistance calculation activator according to Embodiment 4 of the present disclosure. The resistance calculation activator 8C according to Embodiment 4 determines whether or not the AC motor 5 has stopped revolving, on the basis of the powering command signal P that is a drive command signal S1, as well as the brake pressure signal BP and the door open/close signal D that are external signals S2. After the door of the electric car opens and then closes while the brake pressure is equal to or greater than a threshold value, if a powering command is input while a brake command is being input, or if a powering command is input after the brake command is released, the resistance calculation activator 8C determines the start time of the resistance calculation period. The resistance calculation activator 8C according to Embodiment 4 is equipped with the pressure determiner 87 provided in the resistance calculation activator 8A according to Embodiment 2 instead of the OFF delay 81 provided in the resistance calculation activator 8B according to Embodiment 3.

Figure 9:
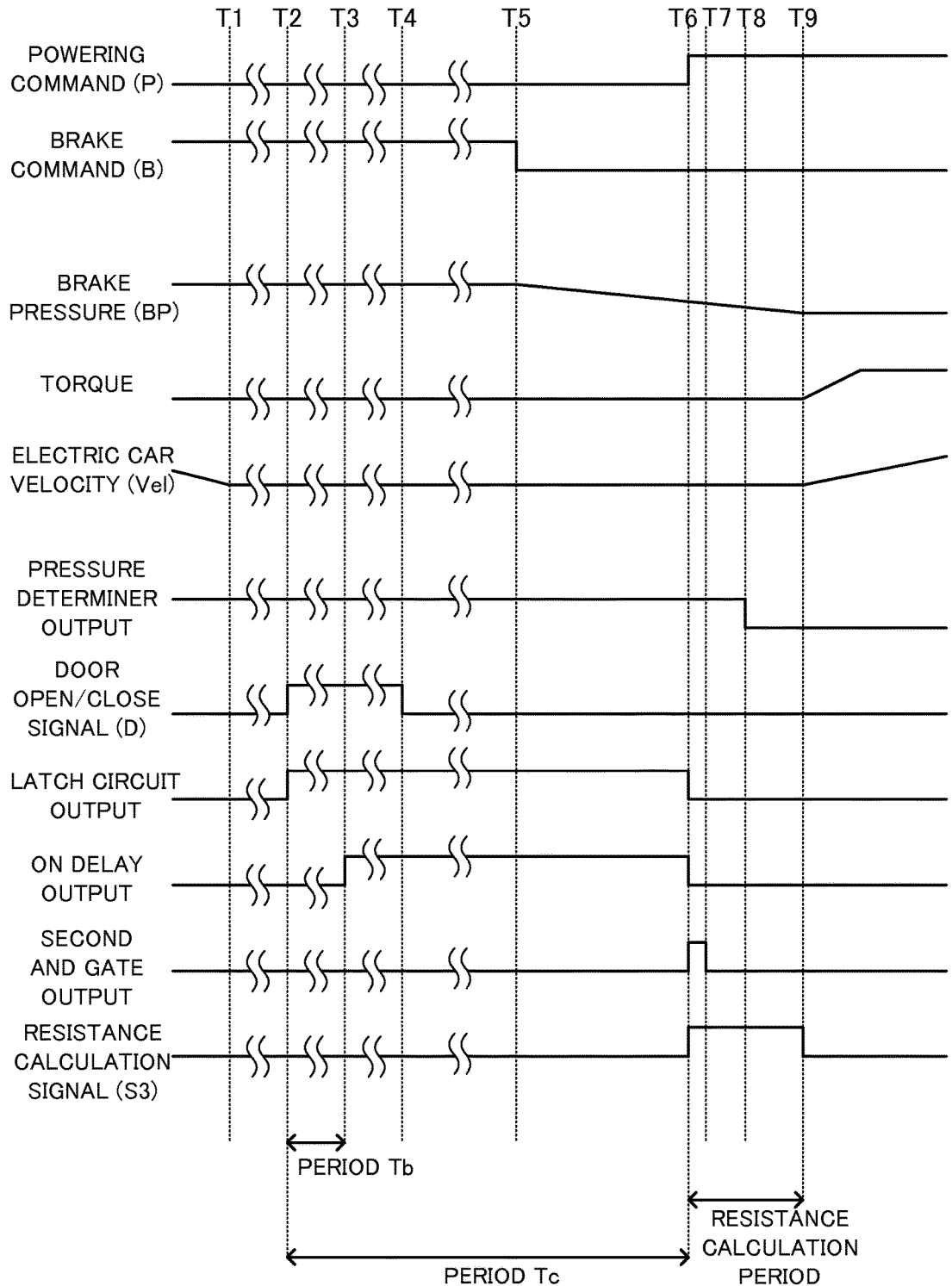
FIG. 9 is a timing chart for describing an operation of a resistance calculation activator according to Embodiment 4 determining a resistance calculation period.

FIG. 9 is a timing chart for describing an operation of a resistance calculation activator according to Embodiment 4 determining a resistance calculation period. FIGS. 8 and 9 will be used to describe an operation of the resistance calculation activator 8C determining the resistance calculation period. The times when the powering command is input and the brake command is released, as well as the changes in the brake pressure, the torque of the AC motor 5, and the electric car velocity are similar to Embodiment 3. However time T8 is the time when the brake pressure becomes less than the threshold value, and is a later time than time T6 when the powering command is input.

The operation of the pressure determiner 87 is similar to Embodiment 2, and the operation of the latch circuit 88 is similar to Embodiment 3. A first AND gate 83C outputs the logical conjunction of the output of the pressure determiner 87 and the output of the latch circuit 88 to the ON delay 84. The output of the first AND gate 83C is at H level from time T2 to time T6, similarly to Embodiment 3. The operation of the ON delay 84, the second AND gate 85, and the resistance calculation signal generator 86 is similar to Embodiment 3. The resistance calculation signal S3 is at H level from time T6 until time T9 that is the point in time after the resistance calculation period elapses.

As described above, in Embodiment 4, a powering command signal P, a brake pressure signal BP and a door open/close signal D are used to determine whether or not the AC motor 5 has stopped revolving, and a resistance value of the AC motor 5 is computed when the AC motor 5 has stopped revolving. Consequently, it becomes possible to improve the accuracy of computing the resistance value.

Embodiment 5

Figure 10:
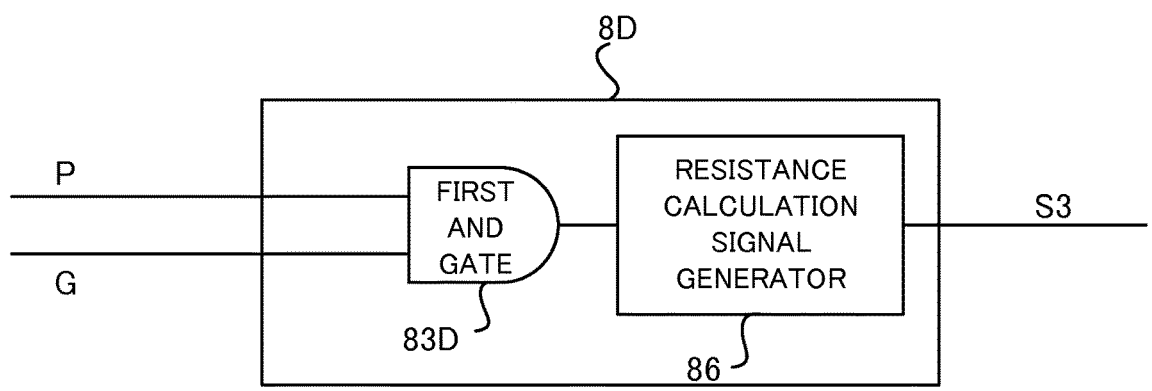
FIG. 10 is a block diagram illustrating an exemplary configuration of a resistance calculation activator according to Embodiment 5 of the present disclosure.

FIG. 10 is a block diagram illustrating an exemplary configuration of a resistance calculation activator according to Embodiment 5 of the present disclosure. The resistance calculation activator 8D according to Embodiment 5 determines whether or not the AC motor 5 has stopped revolving, on the basis of the powering command signal P that is a drive command signal S1, as well as a slope start signal G that is an external signal S2. Slope start refers to applying a degree of braking so that the electric car does not go backward when the electric car is stopped on a rising slope, to prevent going backward due to the slope during the time from when the powering command is input until the torque of the AC motor 5 reaches a value at which the electric car will not go backward even if the brake is released. The signal level of the slope start signal G changes, for example, by the switching ON and OFF of a slope start switch in the driver's cab. For example, the slope start signal G is a signal at H level when in a state of slope start, and at L level when not in a state of slope start.

The resistance calculation activator 8D determines the start time of the resistance calculation period when a powering command is input in a slope start state. The resistance calculation activator 8D is equipped with a first AND gate 83D and a resistance calculation signal generator 86. The powering command signal P and the slope start signal G are input into the first AND gate 83D. The first AND gate 83D outputs the logical conjunction of the powering command signal P and the slope start signal G to the resistance calculation signal generator 86.

Figure 11:
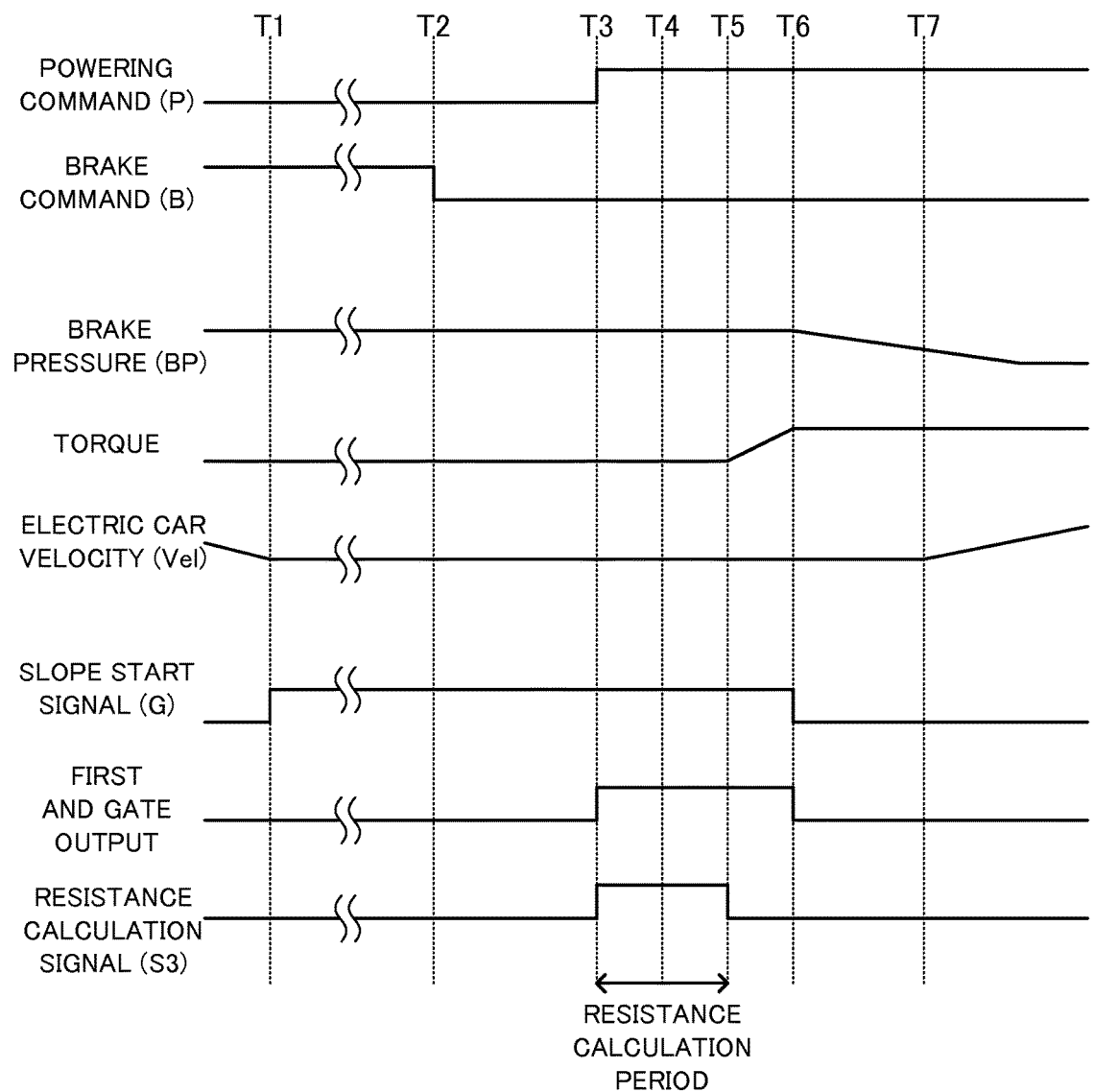
FIG. 11 is a timing chart for describing an operation of a resistance calculation activator according to Embodiment 5 determining a resistance calculation period.

FIG. 11 is a timing chart for describing an operation of a resistance calculation activator according to Embodiment 5 determining a resistance calculation period. In the example of FIG. 11, the slope start switch is turned ON at time T1, the brake command is released at time T2, and the powering command is input at time T3. After the powering command is input at time T3, the torque starts to increase at time T5 after the resistance calculation period elapses from time T3, and since the slope start switch is ON, the electric car remains stopped. The brake pressure starts to decrease from time T6 when the slope start switch is turned OFF, and from time T7 the AC motor 5 starts to revolve, the electric car begins to move, and the electric car velocity gradually increases. FIGS. 10 and 11 will be used to describe an operation of the resistance calculation activator 8D determining the resistance calculation period.

The slope start signal is at H level from time T1 to time T6. The brake pressure is maintained at a certain value while in the slope start state even after the brake command is released at time T2, and gradually decreases after the slope start state ceases at time T6. The output of the first AND gate 83D is at H level from time T3 to time T6. The operation of the resistance calculation signal generator 86 is similar to Embodiment 1. The resistance calculation signal S3 is at H level from time T3 until time T5 after the resistance calculation period elapses.

Figure 12:
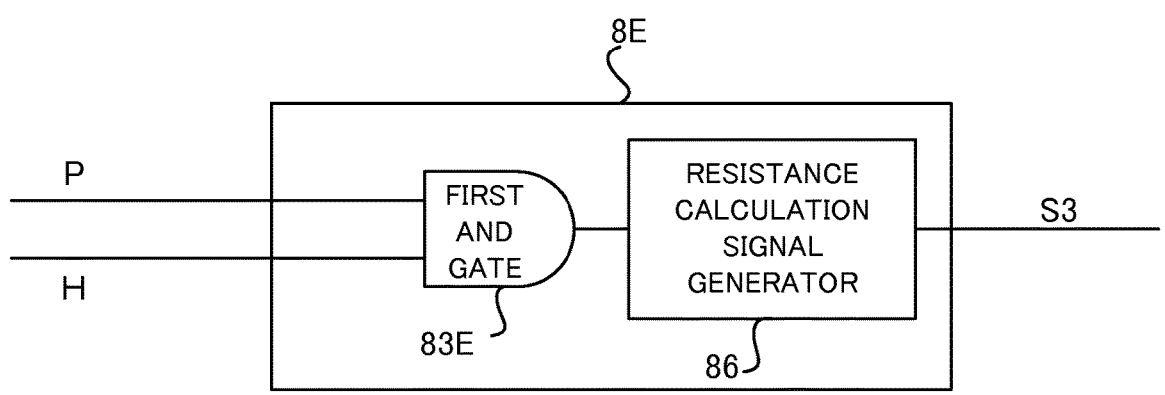
FIG. 12 is a block diagram illustrating a different exemplary configuration of a resistance calculation activator according to Embodiment 5.

FIG. 12 is a block diagram illustrating a different exemplary configuration of a resistance calculation activator according to Embodiment 5. The resistance calculation activator 8E illustrated in FIG. 12 uses a holding brake signal H instead of the slope start signal G used by the resistance calculation activator 8D illustrated in FIG. 10. The resistance calculation activator 8E determines whether or not the AC motor 5 has stopped revolving, on the basis of the powering command signal P that is a drive command signal S1, as well as the holding brake signal H that is an external signal S2. The resistance calculation activator 8E is equipped with a first AND gate 83E and a resistance calculation signal generator 86. The powering command signal P and the holding brake signal H are input into the first AND gate 83E. The first AND gate 83E outputs the logical conjunction of the powering command signal P and the holding brake signal H to the resistance calculation signal generator 86. Compared to the resistance calculation activator 8D, the resistance calculation activator 8E has a different signal used as the external signal S2, but the operation is the same.

The holding brake is provided from the perspective of a failsafe. While the electric car is stopped, braking force is continuously applied to the wheels of the electric car by a mechanical brake device. After a powering signal is input and the torque of the AC motor 5 reaches a predetermined value, the mechanical brake device releases the braking force. The holding brake signal H is output by the mechanical brake device, and is a signal at H level if in the holding brake state, and at L level if in a state in which the holding brake state is released, for example.

Signals other than the slope start signal G and the holding brake signal H may also be used, and the AC motor 5 may be determined to have stopped revolving while a mechanical brake active signal that is a signal indicating that the mechanical brake device is actively operating, is being output.

As described above, in Embodiment 5, a powering command signal P and a gradient start signal G or a holding brake signal H are used to determine whether or not the AC motor 5 has stopped revolving, and a resistance value of the AC motor 5 is computed when the AC motor 5 has stopped revolving. Consequently, it becomes possible to improve the accuracy of computing the resistance value.

Embodiment 6

Figure 13:
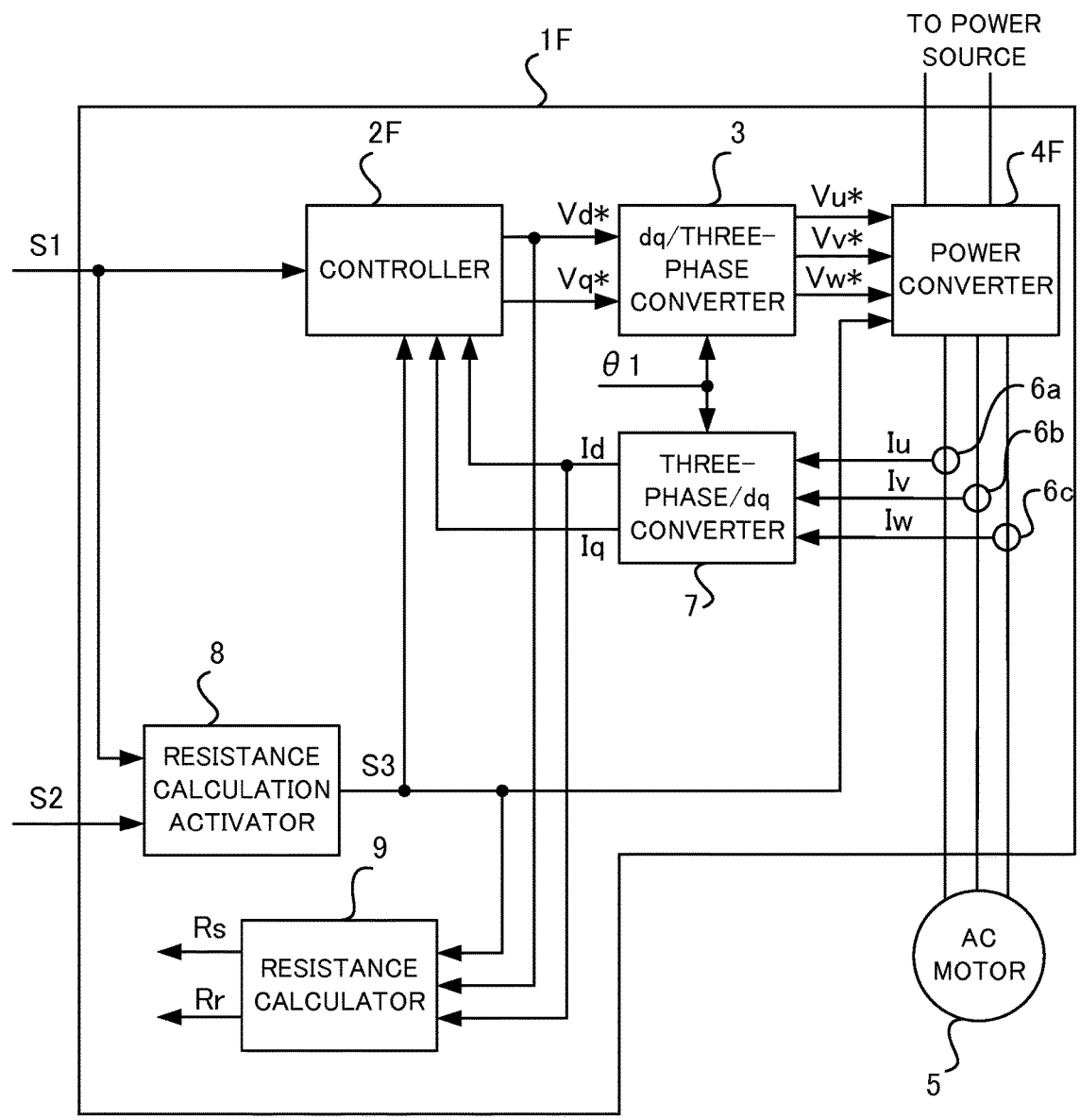
FIG. 13 is a block diagram illustrating an exemplary configuration of a control device for an electric car according to Embodiment 6 of the present disclosure.

FIG. 13 is a block diagram illustrating an exemplary configuration of a control device for an electric car according to Embodiment 6 of the present disclosure. The configuration of the control device 1F is similar to the control device 1 in the case of Embodiment 1. However, the resistance calculation signal S3 from the resistance calculation activator 8 is input into the controller 2F included in the control device 1F in Embodiment 6. The power converter 4F conducts pulse width modulation (PWM) control, and the resistance calculation signal S3 from the resistance calculation activator 8 is input into the power converter 4F. The PWM control uses the method described in, for example, "Chapter 3: Power Conversion Circuits", *Theory and Actual Design of AC Servo Systems*, Hidehiko Sugimoto, Sogo Denshi Shuppan, pp. 31-71.

In the power converter 4F, switching elements connected in series are alternately switched ON or OFF. In order to prevent the switching elements from entering the ON state simultaneously and creating a short circuit, a short circuit prevention time Td during which the switching elements simultaneously turn OFF is provided when switching ON and OFF. Because of the short circuit prevention time Td, deviation voltages are produced that are the differences between the phase voltage command values Vu*, Vv*, and Vw*, and the voltages output by the power converter 4F. The deviation voltages respectively have the opposite polarity and the same phase as the phase current values Iu, Iv, and Iw output by the power converter 4F, and each of the deviation voltages may be considered as a square wave voltage having a certain amplitude. An approximation of the amplitude ΔVd of this deviation voltage is expressed by formula (3) below. In formula (3) below, Fc is the carrier frequency that determines the period of the pulse signal for PWM control used in the power converter 4F, and Vdc is the input DC voltage into the power converter 4F.

[Math. 3]

$$\Delta Vd \approx Td \cdot Fc \cdot Vdc \quad (3)$$

For example, suppose that Td=15 μsec, Fc=3 kHz, and Vdc=280 V. According to the above formula (3), the amplitude ΔVd of the deviation voltage is 12.6 V. In Patent Literature 3, the input voltage Vd into the AC motor 5 in the rotating coordinate system is assumed to match the d-axis voltage command value Vd*, and the d-axis voltage command value Vd* is divided by the d-axis current value Id to compute the primary resistance value Rs of the AC motor 5. For example, supposing that the d-axis current value Id is 11.1 A that is the amplitude of the rated exciting current, and supposing that the primary resistance value Rs is 0.407Ω, the d-axis voltage command value Vd* must be 4.518 V to correctly compute the primary resistance value Rs. Since the amplitude ΔVd of the deviation voltage is 12.6 V as discussed above, the d-axis voltage command value Vd* must be 17.1 V to cause a 11.1 A current to flow. For this reason, in the method of Patent Literature 3 that assumes that the input voltage Vd matches the d-axis voltage command value Vd*, a larger-than-actual resistance value is computed. To improve the accuracy of computing the resistance value of the AC motor 5, the d-axis voltage command value Vd* must be corrected to reduce the effect of the deviation voltage, and decrease the difference between the d-axis voltage command value Vd* and the input voltage Vd.

Methods of decreasing the effect of the deviation voltage include a method that raises the proportional gain $k_{cp}$ and the time constant $\omega_{cpi}$, indicated in the above formula (2), and a method that detects the orientation of the phase current values Iu, Iv, and Iw, and adds to the phase voltage command values Vu*, Vv*, and Vw* a voltage for cancelling out the deviation voltage according to the orientation of the output current. However, correctly zeroing out the effect of the deviation voltage is difficult. In addition, with a method that controls the phase voltage command values Vu*, Vv*, and Vw* so that waveforms based on the phase voltage command values Vu*, Vv*, and Vw* match the output voltages of the power converter, it is necessary to provide a sensor that detects the output voltages of the power converter, and the manufacturing cost of the control device 1 increases.

Additionally, from the perspective of issues such as energy conservation, reduced maintenance, and low noise, a totally enclosed motor is used for the AC motor of the electric car. To reduce energy loss, a totally enclosed motor typically uses a small resistance value on the order of several tens of milliohms. Since the effect of the deviation voltage becomes larger as the resistance value of the motor becomes smaller, to improve the accuracy of computing the resistance value in a totally enclosed motor, the d-axis voltage command value Vd* needs to be corrected in order to reduce the effect of the deviation voltage and decrease the error between the d-axis voltage command value Vd* and the input voltage Vd.

Consequently, while the resistance calculator 9 is computing the resistance, or in other words, when the resistance calculation signal S3 is at H level, the controller 2F configures the d-axis current command value Id* to a current value within a set range that is larger than the amplitude of the rated exciting current of the AC motor 5. Preferably, the set range is greater than the amplitude of the rated exciting current, and less than or equal to 5 times the amplitude of the rated exciting current. For example, the d-axis current command value Id* is set to 5 times the rated exciting current.

When the AC motor 5 has stopped revolving, the input voltage Vd may be computed by multiplying the d-axis current value Id by the primary resistance value Rs. In such a case, if the d-axis current value Id is treated as being equal to the d-axis current command value Id*=55.5 A, and the primary resistance value Rs is 0.407Ω, the input voltage Vd is 22.856 V. The signal-to-noise (S/N) ratio is greatly improved compared to the S/N ratio of the input voltage Vd with respect to the deviation voltage in the case of setting the d-axis current command value Id* to the same value as the amplitude of the rated exciting current. As a result, it becomes possible to improve the accuracy of computing the resistance value of the AC motor 5. Furthermore, by using switching elements formed by wide-bandgap semiconductors for the power converter, a larger current may be made to flow through the AC motor compared to silicon-based switching elements, thereby enabling improved accuracy of computing the resistance value of the AC motor.

The power converter 4F switches the carrier frequency that determines the period of the pulse signal for PWM control according to the determination result of the resistance calculation activator 8. When the resistance calculation signal S3 is at H level, the carrier frequency is set to a carrier frequency in a set range that is lower than the carrier frequency used in the case in which the resistance calculation activator 8 determines that the AC motor 5 is revolving. For example, when the carrier frequency of 3 kHz is used in the case in which the AC motor 5 is revolving, the power converter 4F preferably configures the carrier frequency to a frequency in the range from 300 Hz to 700 Hz inclusive. For example, in the case of setting the carrier frequency to 500 Hz, the amplitude ΔVd of the deviation voltage becomes 2.1 V, and the S/N ratio of the input voltage Vd with respect to the deviation voltage is greatly improved. As a result, it becomes possible to improve the accuracy of computing the resistance value of the AC motor 5.

Note that the control device may also be configured to conduct only one of either changing the d-axis current command value Id* in the controller or changing the carrier frequency in the power converter.

As described above, in Embodiment 6, by conducting at least one of either changing the d-axis current command value Id* or changing the carrier frequency, it becomes possible to improve the accuracy of computing the resistance value of the AC motor 5.

Embodiment 7

Figure 14:
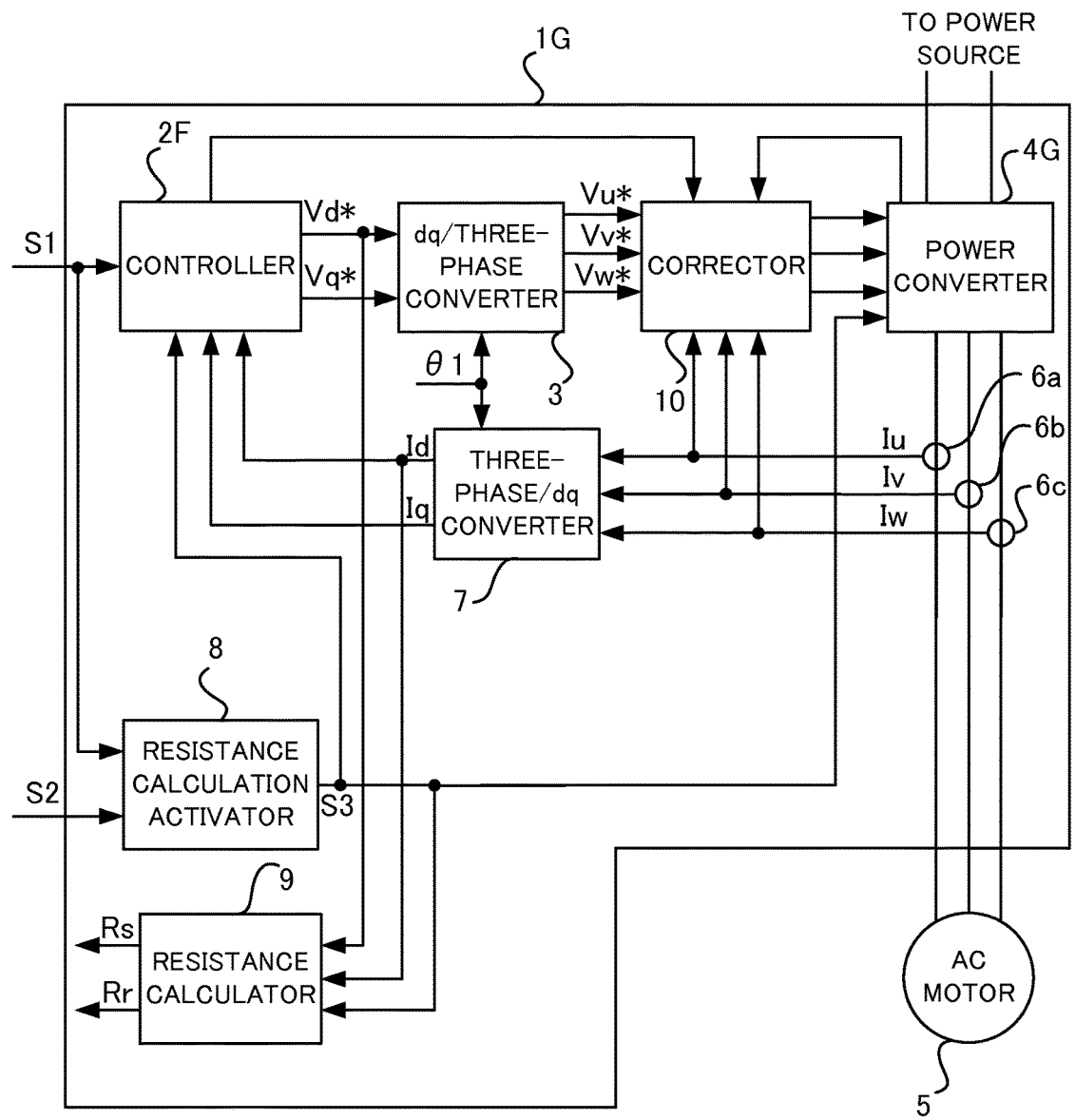
FIG. 14 is a block diagram illustrating an exemplary configuration of a control device for an electric car according to Embodiment 7 of the present disclosure.

FIG. 14 is a block diagram illustrating an exemplary configuration of a control device for an electric car according to Embodiment 7 of the present disclosure. The control device 1G in Embodiment 7 is equipped with a corrector 10 in addition to the configuration of the control device 1F in the case of Embodiment 6. Input into the corrector 10 are values/information: the d-axis current command value Id* from the controller 2F, the phase voltage command values Vu*, Vv*, and Vw* from the dq/three-phase converter 3, the phase current values Iu, Iv, and Iw from the current detectors 6a, 6b, 6c, and information required to correct the deviation voltage, such as the short circuit prevention time Td, the carrier frequency Fc, and the input DC voltage Vdc, from the power converter 4G.

The corrector 10 computes a correction amount for decreasing the amplitude of a deviation voltage computed as the difference between the pre-correction voltage command value and the voltage output by the power converter, corrects the phase voltage command values Vu*, Vv*, and Vw* on the basis of the correction amount, and sends the corrected voltage command values that are the corrected phase voltage command values, to the power converter 4G. The corrector 10 operates as a command value corrector that corrects the voltage command value for the power converter 4G while taking account of the current value output by the power converter 4G and the characteristics of the power converter 4G, and sends the corrected voltage command value to the power converter 4G. The corrector 10 may also correct the d-axis voltage command value Vd* and the q-axis voltage command value Vq*.

When the resistance calculation signal S3 is at H level and the value of at least one of the d-axis current command value Id* and the carrier frequency is changed as with the control device 1F in the case of Embodiment 6, the corrector 10 controls the correction amount on the basis of the changed value.

The above formula (3) gives an approximation of the amplitude of the deviation voltage due to switching in the power converter, but the deviation voltage that is actually produced exhibits a current dependency in which the deviation voltage changes according to the magnitude of the current flowing through each phase of the AC motor, as described in Unexamined Japanese Patent Application Kokai Publication No. H5-260755, for example. For this reason, by compensating the deviation voltage while taking account of the current dependency, it becomes possible to improve the accuracy of computing the resistance value of the AC motor 5.

Figure 15:
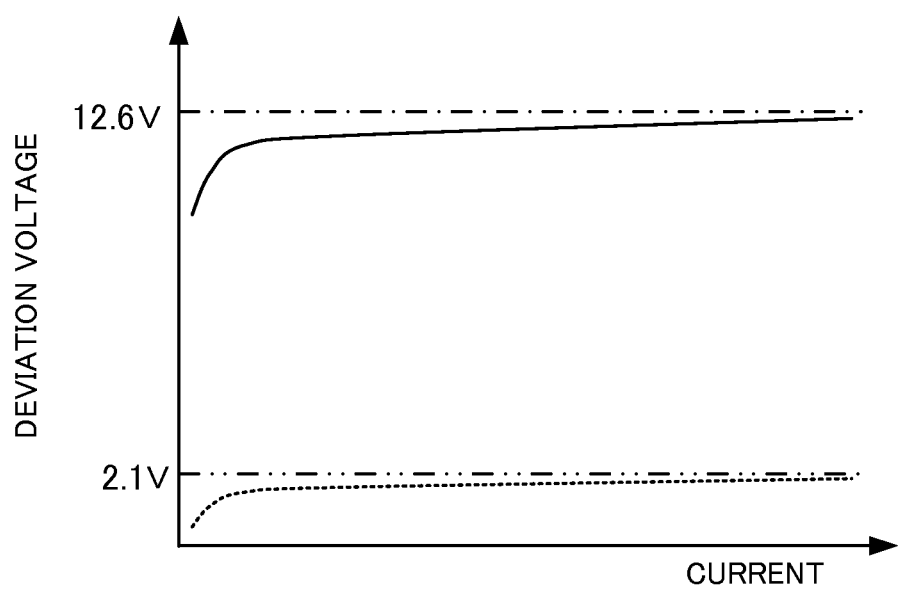
FIG. 15 is a diagram illustrating change in the amplitude of a deviation voltage in Embodiment 7.

FIG. 15 is a diagram illustrating change in the amplitude of the deviation voltage in Embodiment 7. The horizontal axis is the amplitude III of the phase current, while the vertical axis is the amplitude of the deviation voltage. The one-dot chain line is a plot of the theoretical values of the amplitude of the deviation voltage in the case of setting the carrier frequency to 3 kHz, while the solid line is a plot of the actual values. In addition, the two-dot chain line is a plot of the theoretical values of the amplitude of the deviation voltage in the case of setting the carrier frequency to 500 Hz, while the dashed line is a plot of the actual values. The graph demonstrates that the actual value of the amplitude of the deviation voltage is less than the theoretical value, and exhibits a current dependency that varies depending on the amplitude III of the phase current. This is known to occur because of the effects of parasitic capacitance in components such as the gate circuits of the switching elements, line connections, or the like provided in the power converter.

Since the deviation voltage varies according to the d-axis current value Id and the carrier frequency as discussed above, the corrector 10 controls the correction amount on the basis of the current value output by the power converter 4G and the characteristics of the power converter 4G, such as changes in the d-axis current command value Id* and the carrier frequency, for example. For example, the corrector 10 reduces the correction amount when the carrier frequency is changed from 3 kHz to 500 Hz. By controlling the correction amount on the basis of changes in the d-axis current command value Id* and the carrier frequency, the S/N ratio of the input voltage Vd with respect to the deviation voltage is improved. As a result, it becomes possible to improve the accuracy of computing the resistance value of the AC motor 5.

Figure 16:
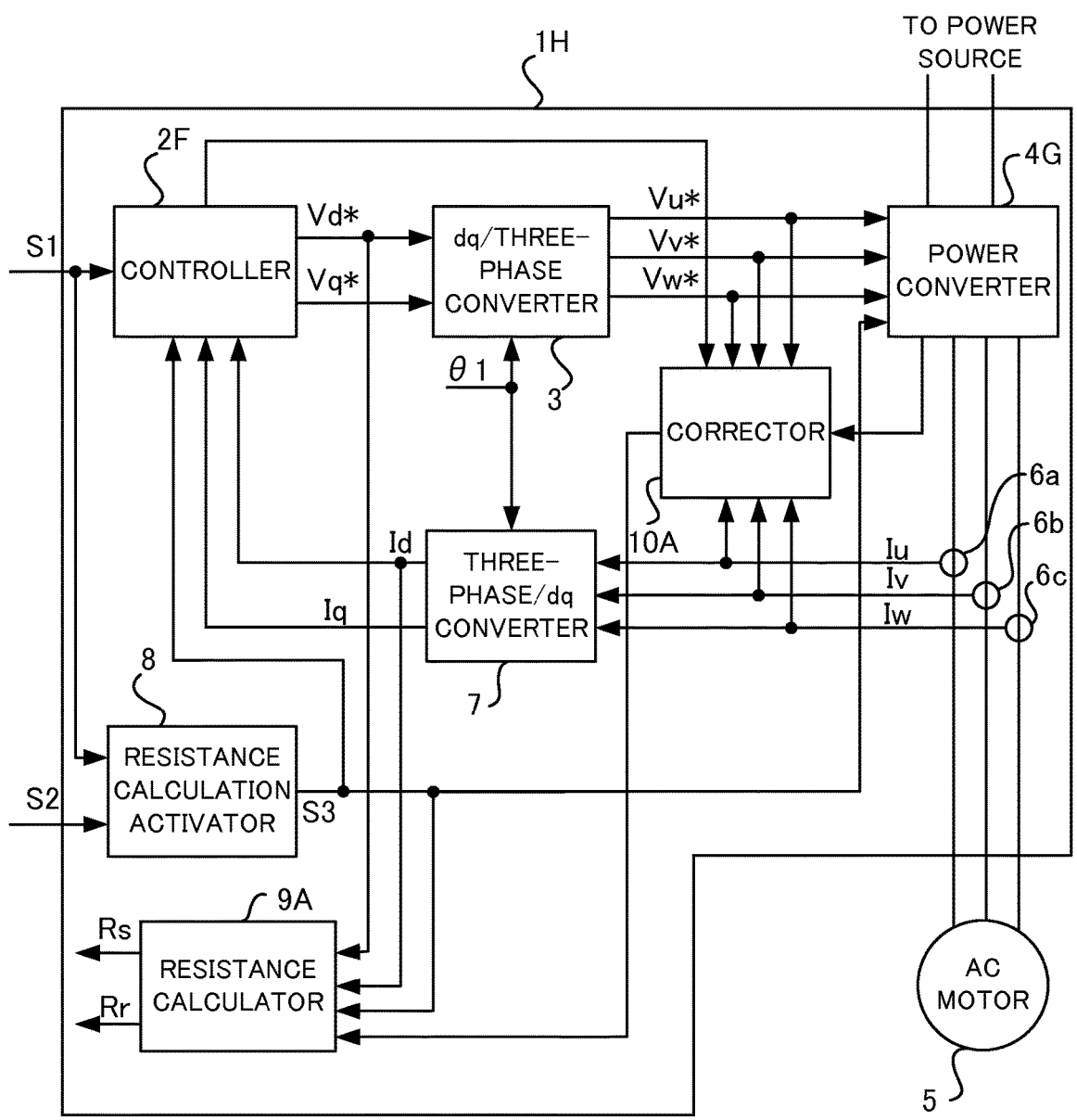
FIG. 16 is a block diagram illustrating a different exemplary configuration of a control device for an electric car according to Embodiment 7.

FIG. 16 is a block diagram illustrating a different exemplary configuration of a control device for an electric car according to Embodiment 7. The corrector 10A provided in the control device 1H sends the computed correction amount for the amplitude ΔV of the deviation voltage to the resistance calculator 9A. The resistance calculator 9A corrects the d-axis voltage command value Vd* on the basis of the correction amount, and computes the resistance value of the AC motor 5 on the basis of the corrected d-axis voltage command value and the d-axis current value Id. The corrector 10A and the resistance calculator 9A act cooperatively to operate as a voltage estimator that compute, on the basis of the voltage command value, an estimated voltage whose difference with the voltage output by the power converter 4G is smaller than that of the voltage command value, while taking account of the current value output by the power converter 4G and the characteristics of the power converter 4G. The resistance calculator 9A computes the resistance value of the AC motor 5 by using the estimated voltage instead of the voltage command value.

Note that the corrector 10A may also be configured to generate the estimated voltage from the voltage command value and the correction amount, and the resistance calculator 9A may be configured to compute the resistance value of the AC motor 5 by using the estimated voltage sent from the correction calculator 10A instead of the voltage command value. In this case, the corrector operates as a voltage estimator. Since the difference between the voltage output by the power converter and the estimated voltage is smaller than the deviation voltage, it becomes possible to improve the accuracy of computing the resistance value of the AC motor, similarly to the examples discussed above.

As described above, in Embodiment 7, by controlling a correction amount for the amplitude ΔV of the deviation voltage on the basis of changes in the d-axis current command value Id* and the carrier frequency, it becomes possible to improve the accuracy of computing the resistance value.

Embodiment 8

Figure 17:
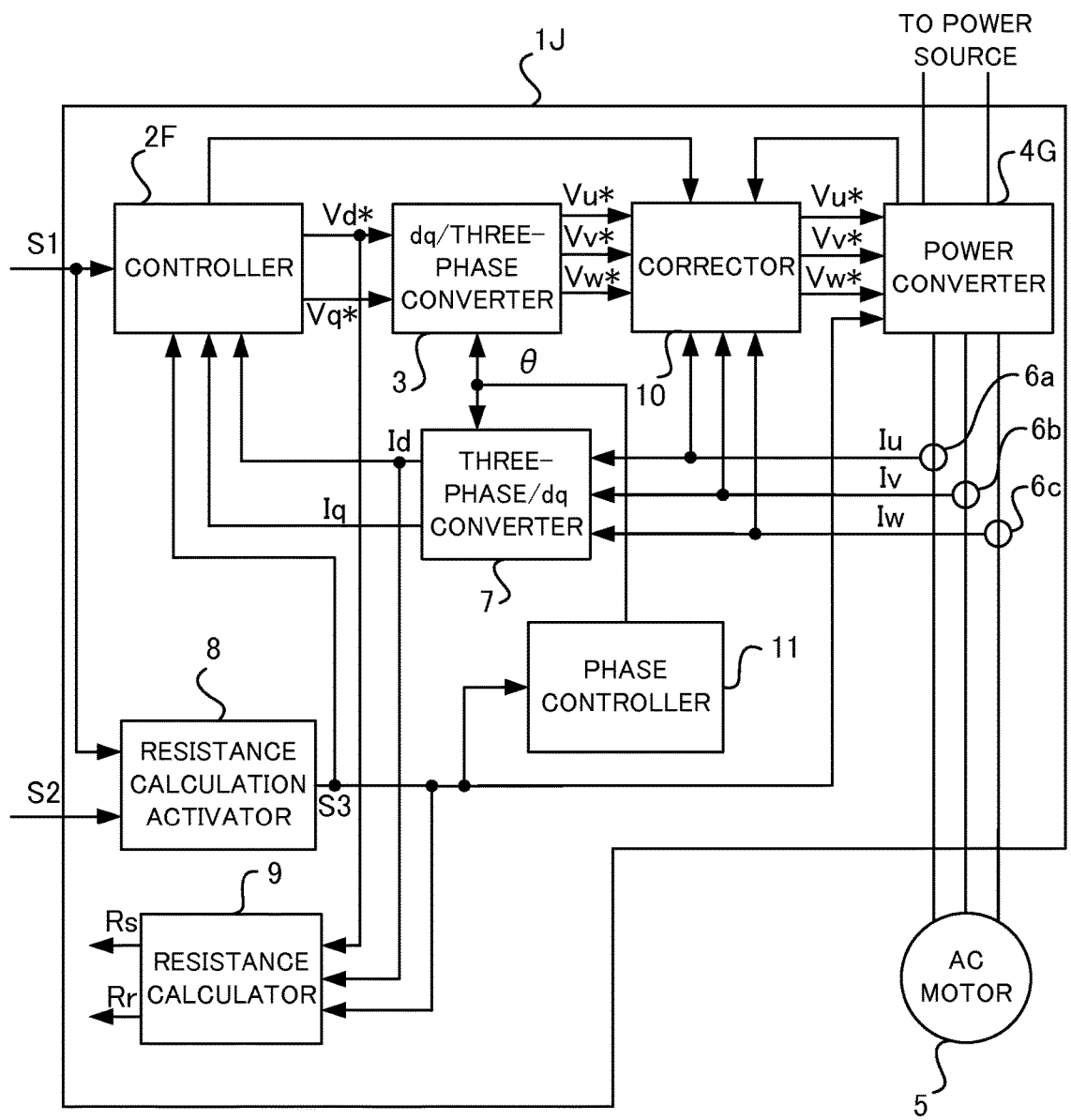
FIG. 17 is a block diagram illustrating an exemplary configuration of a control device for an electric car according to Embodiment 8 of the present disclosure.

FIG. 17 is a block diagram illustrating an exemplary configuration of a control device for an electric car according to Embodiment 8 of the present disclosure. The control device 1J in Embodiment 8 is equipped with a phase controller 11 in addition to the configuration of the control device 1G in the case of Embodiment 7. The phase controller 11 sends the phase θ of the d-axis with respect to the U-phase axis to the dq/three-phase converter 3 and the three-phase/dq converter 7. The resistance calculation signal S3 from the resistance calculation activator 8 is input into the phase controller 11. While the resistance calculator 9 is computing the resistance, or in other words, when the resistance calculation signal S3 is at H level, the phase controller 11 sends the phase θ so that the amplitudes of the phase current values Iu, Iv, and Iw become a set value or greater. The dq/three-phase converter 3 and the three-phase/dq converter 7 conduct coordinate perform using the phase θ output by the phase controller 11.

Figure 18A:
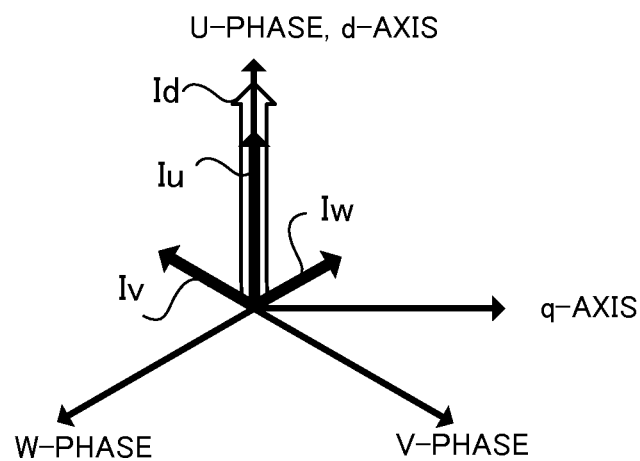
FIG. 18A is a diagram illustrating phase currents in Embodiment 8.
Figure 18B:
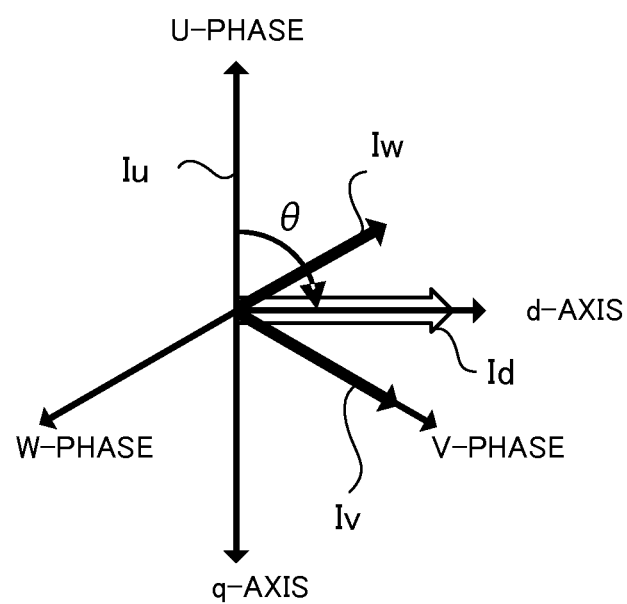
FIG. 18B is a diagram illustrating phase currents in Embodiment 8.

FIGS. 18A and 18B are diagrams illustrating phase currents in Embodiment 8. FIG. 18A is a diagram illustrating the relationship between the d-axis current value Id, q-axis current value Iq, and the phase current values Iu, Iv, and Iw in the case in which the phase θ=0°, while FIG. 18B is a diagram of the case in which the phase θ=90°. In the case of θ=0°, the phase current values Iu, Iv, and Iw are expressed by the following formula (4), while in the case of θ=90°, the phase current values Iu, Iv, and Iw are expressed by the following formula (5).

[Math. 4]

$$Iu = \sqrt{\frac{2}{3}} \cdot Id$$
$$Iv = -\frac{1}{\sqrt{6}} \cdot Id$$
$$Iw = -\frac{1}{\sqrt{6}} \cdot Id$$

(4)

[Math. 5]

$$Iu = 0$$
$$Iv = \frac{1}{\sqrt{2}} \cdot Id$$
$$Iw = -\frac{1}{\sqrt{2}} \cdot Id$$

(5)

Since each of the deviation voltages has the opposite polarity of the phase current values Iu, Iv, and Iw output by the power converter 4, it is necessary to suitably change the sign of the correction amount computed by the corrector 10 according to the direction of current flowing through the AC motor 5. In the case of θ=90°, the phase current value Iu is 0 A. A slight phase current value Iu is produced due to an offset of the current detector 6a or a ripple current produced by such as ON/OFF switching of the switching elements provided in the power converter 4, and if the sign of the phase current value Iu changes, the sign of the correction amount computed by the corrector 10 changes. If the sign of the correction amount changes frequently in a short time, there is a risk that the corrector 10 will increase the deviation voltage. On the other hand, in the case of θ=0°, the sign of the correction amount does not change frequently as discussed above. Consequently, by performing coordinate conversion using a phase such as θ=0°, for example, at which the amplitudes of the phase current values Iu, Iv, and Iw supplied to the AC motor 5 are equal to or greater than a set value, the S/N ratio of the input voltage Vd with respect to the deviation voltage is improved. The amplitudes of the phase current values Iu, Iv, and Iw are not limited to the above example, and may be any values so that the sign of the correction amount does not change frequently.

As described above, in Embodiment 8, by performing coordinate conversion using a phase so that the amplitudes of the phase current values Iu, Iv, and Iw become equal to or greater than a set value, it becomes possible to improve the accuracy of computing the resistance value of the AC motor.

Embodiment 9

Figure 19:
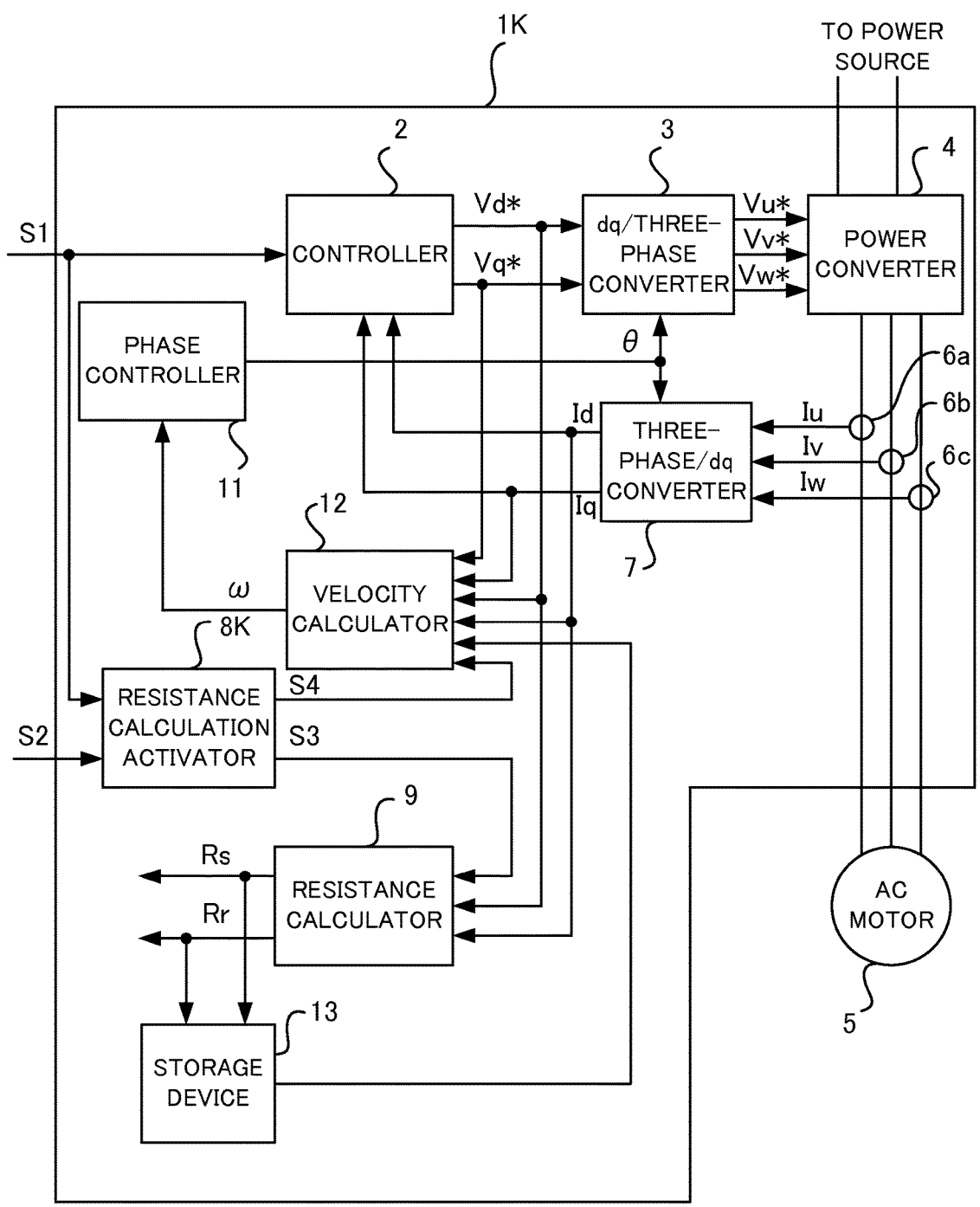
FIG. 19 is a block diagram illustrating an exemplary configuration of a control device for an electric car according to Embodiment 9 of the present disclosure.

FIG. 19 is a block diagram illustrating an exemplary configuration of a control device for an electric car according to Embodiment 9 of the present disclosure. The control device 1K in Embodiment 9 is equipped with a phase controller 11, a velocity calculator 12, and a storage device 13 that stores the resistance value computed by the resistance calculator 9, in addition to the configuration of the control device 1 in the case of Embodiment 1. The phase controller 11 sends the phase θ of the d-axis with respect to the U-phase axis to the dq/three-phase converter 3 and the three-phase/dq converter 7. The dq/three-phase converter 3 and the three-phase/dq converter 7 perform coordinate conversion using the phase θ output by the phase controller 11.

The control device 1K in Embodiment 9 of the present disclosure relates to a control device of an electric car with velocity sensor-less control, and activates the AC motor 5 when the AC motor 5 has stopped revolving or is freely revolving, without using a velocity detector. In the case of controlling the AC motor by velocity sensor-less control, the primary resistance value Rs of the AC motor is used in formula (6) that is the operation expression used in the velocity calculator 12 discussed later, thus demonstrating that there is a close relationship between the computational accuracy of the angular velocity and the computational accuracy of the resistance value for an AC motor. By using the control device 1K in Embodiment 9, the advantageous effect of improving the computational accuracy of the angular velocity and the computational accuracy of the resistance value at the same time is obtained.

The resistance calculation activator 8 determines whether the AC motor 5 is revolving or has stopped revolving on the basis of the drive command signal S1 and the external signal S2, and if a powering command is input when it is determined that the AC motor 5 has stopped revolving, the resistance calculation activator 8K sends a resistance calculation signal S3 notifying the start of resistance calculation to the resistance calculator 9. Also, if a powering command is input while in a state in which the AC motor 5 is determined to be revolving, a velocity calculation signal S4 notifying the start of velocity calculation is sent to the velocity calculator 12.

If a powering command is input as a drive command while in a state in which the electric car is determined to be stopped on the basis of the drive command signal S1 and the external signal S2, the resistance calculation activator 8K determines the start time of the resistance calculation period. The resistance calculation activator 8K sends the resistance calculation signal S3 at sustained H level during the resistance calculation period to the resistance calculator 9. While the resistance calculation signal S3 is at H level, the resistance calculator 9 computes the primary resistance value Rs and the secondary resistance value Rr of the AC motor 5, and stores the resistance values in the storage device 13. If a powering command is input as a drive command in the case of not determining that the electric car is stopped, the resistance calculation activator 8K sends the velocity calculation signal S4 at sustained H level during a velocity calculation period of set length starting after the powering command is input, to the velocity calculator 12.

Figure 20:
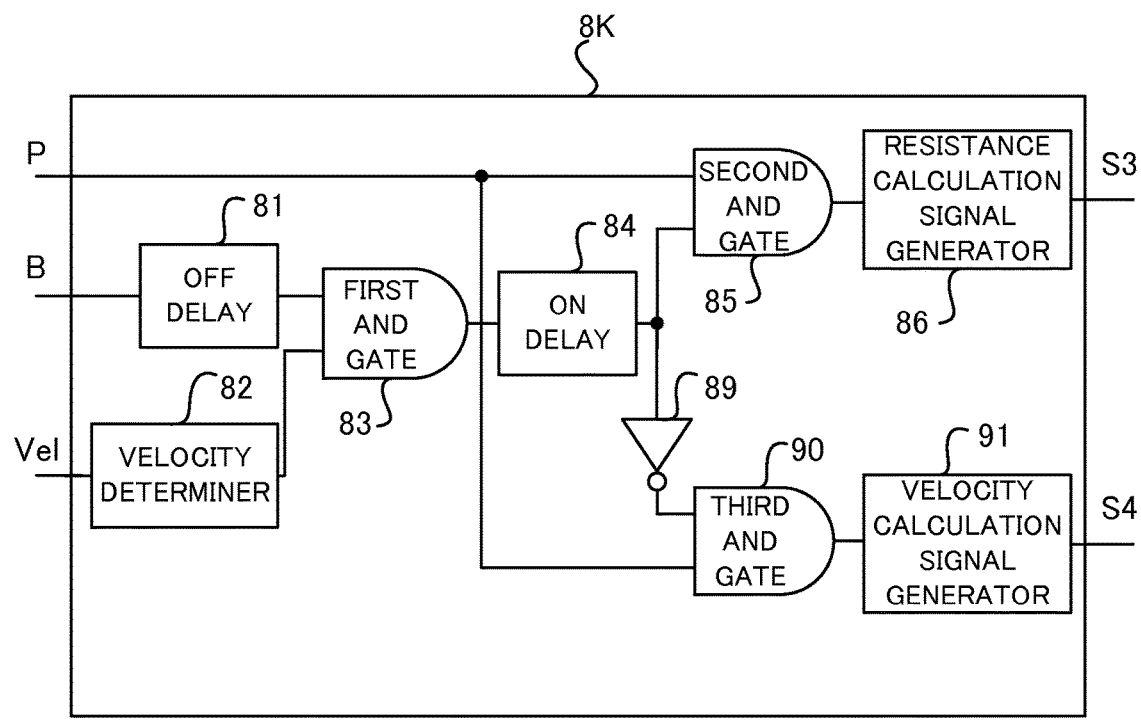
FIG. 20 is a block diagram illustrating an exemplary configuration of a resistance calculation activator according to Embodiment 9.

FIG. 20 is a block diagram illustrating an exemplary configuration of a resistance calculation activator according to Embodiment 9. The resistance calculation activator 8K according to Embodiment 9 is equipped with a NOT gate 89, a third AND gate 90, and a velocity calculation signal generator 91, in addition to the configuration of the resistance calculation activator 8 according to Embodiment 1. The resistance calculation activator 8K according to Embodiment 9 may also be configured to include the NOT gate 89, the third AND gate 90, and the velocity calculation signal generator 91 in addition to the configuration of the resistance calculation activator 8A, 8B, 8C, 8D, or 8E discussed above.

The NOT gate 89 outputs the inverted value of the output of the ON delay 84. The third AND gate 90 outputs the logical conjunction of the powering command signal P and the output of the NOT gate 89 to the velocity calculation signal generator 91. The velocity calculation signal generator 91, in the case of detecting the rising edge of the input signal, outputs the velocity calculation signal S4 at sustained H level during a velocity calculation period of set length starting from the rising edge. For example, the length of the velocity calculation period is set to 200 msec. In this way, the resistance calculation activator 8K is characterized by sending the resistance calculation signal S3 to the resistance calculator 9, and the velocity calculation signal S4 to the velocity calculator 12.

Figure 21:
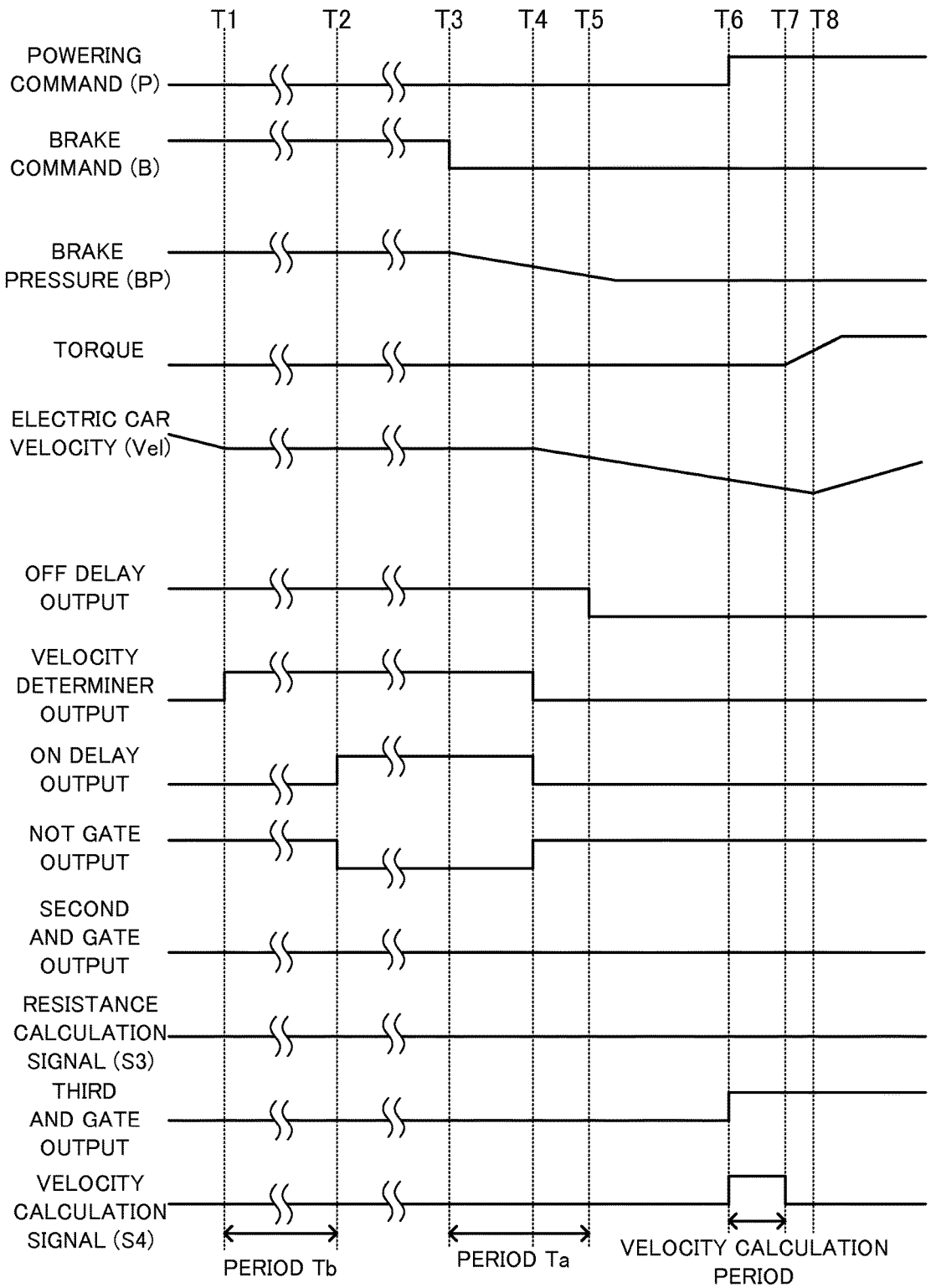
FIG. 21 is a timing chart for describing an operation of a resistance calculation activator according to Embodiment 9 determining a velocity calculation period.

FIG. 21 is a timing chart for describing an operation of a resistance calculation activator according to Embodiment 9 determining a velocity calculation period. In the example of FIG. 21, at time T3 the brake command is released, and at time T6 a powering command is input. After the brake command is released at time T3, the brake pressure gradually decreases. In the case in which the electric car is stopped at a station on a rising slope, for example, when the brake pressure decreases to less than the lower limit stopping the rotation of the wheels at time T4, the electric car begins to move backward, and the AC motor 5 starts to revolve. After the powering command is input at time T6, the torque starts to increase at time T7, and after that, the electric car begins to move forward from time T8, and the electric car velocity gradually increases. FIGS. 20 and 21 will be used to describe an operation of the resistance calculation activator 8K determining the velocity calculation period that is different from Embodiment 1.

Before the powering command is input, the electric car is not in a state in which the electric car may be determined to be stopped, and thus the output of the second AND gate 85 does not go to H level, and the resistance calculation signal S3 likewise does not go to H level. The output of the third AND gate 90 goes to H level at time T6. The velocity calculation signal S4 is at H level from time T6 until time T7 after the velocity calculation period elapses.

If a powering command is input as a drive command while the resistance calculation activator 8K has not determined that the AC motor 5 has stopped revolving, or in other words, while the velocity calculation signal S4 is at H level, the velocity calculator 12 computes the angular velocity of the AC motor 5 on the basis of the d-axis current value Id, the q-axis current value Iq, the d-axis voltage command value Vd*, the q-axis voltage command value Vq*, and the primary resistance value Rs computed by the resistance calculator 9 and stored in the storage device 13. For the angular velocity computation, the velocity calculator 12 may use the last value of primary resistance value Rs stored in the storage device 13, an average value or median value of a set number of last stored primary resistance values Rs, a value obtained by multiplying the primary resistance value Rs by a set gain, or the like. Consequently, it is possible to improve the accuracy of computing the velocity.

The velocity calculator 12 uses technology of the related art as described in Patent Literature 3, for example, to compute the angular velocity ω of the AC motor 5, and sends the angular velocity ω to the phase controller 11. The angular velocity ω is expressed by the following formula (6). In the following formula (6), φds is the d-axis component of the armature flux of the AC motor 5, and is expressed by the following formula (7).

[Math. 6]

$$\omega = \frac{(Vq^* - Rs \cdot Iq)}{\phi ds} \quad (6)$$

-continued

[Math. 7]

$$\phi ds = \int (Vd^* - Rs \cdot Id) dt \qquad (7)$$

Note that the above describes operation when a powering command is input as a drive command in the case in which the resistance calculation activator 8K has not determined that the AC motor 5 has stopped revolving, or in other words, while the velocity calculation signal S4 is at H level. When the resistance calculation activator 8K determines that the AC motor 5 has stopped revolving, the velocity calculator 12 does not perform the computation in the above formula (6), and instead outputs ω=0 to the phase controller 11.

As described in Embodiments 6 to 8, the effects of the deviation voltage cause an issue in which the angular velocity ω of the AC motor 5 computed on the basis of the above formula (6) does not become 0, even if the AC motor 5 has stopped revolving. Accordingly, in Embodiment 9, when the resistance calculation activator 8K determines that the AC motor 5 has stopped revolving, the velocity calculator 12 does not perform the computation in the above formula (6), and instead sets ω=0, thereby making it possible to remove velocity error from velocity sensor-less control, and improve the torque control accuracy.

Furthermore, the above demonstrates that in the case of the AC motor 5 revolving slightly, lowering of the accuracy of computing the velocity is caused by reasons similar to the above. In such cases, by performing the methods described in Embodiments 6 to 8 during the velocity calculation period, it is possible to improve the accuracy of computing the angular velocity of the AC motor similarly to the accuracy of computing the resistance value of the AC motor.

The phase controller 11 accepts the angular velocity ω from the velocity calculator 12 as input, integrates the angular velocity w to compute the phase, and sends the phase to the dq/three-phase converter 3 and the three-phase/dq converter 7 as the phase θ. If the resistance calculator 9 computes the resistance as in Embodiment 1, the phase controller 11 sends an arbitrary phase θ1 to the dq/three-phase converter 3 and the three-phase/dq converter 7 as the phase θ.

In Patent Literature 2, the angular velocity ω is computed, and the resistance value of the AC motor is computed when the angular velocity ω is 0. On the other hand, in Embodiment 9, since one of either computing the resistance value or computing the angular velocity of the AC motor is performed, it is possible to shorten the time until the control device 1 starts velocity sensor-less control of the AC motor.

As described above, in Embodiment 9, it is possible to improve the accuracy of computing the angular velocity and the accuracy of computing the resistance value for the AC motor at the same time, and furthermore, it is possible to shorten the time until the control device starts velocity sensor-less control of the AC motor.

An embodiment of the present disclosure is not limited to the embodiments discussed above, and may also be configured by arbitrarily combining multiple embodiments from among the embodiments discussed above. The power converter may also be configured to use switching elements that are formed by wide-bandgap semiconductors that have a larger bandgap compared to silicon. A wide-bandgap semiconductor refers to silicon carbide, gallium nitride-based materials, or diamond. Switching elements formed by wide-bandgap semiconductors have a high withstanding voltage and allowable current density.

As discussed above in Embodiment 6, by using switching elements formed by wide-bandgap semiconductors, a larger current may be made to flow through the AC motor compared to silicon-based switching elements, thereby enabling improved accuracy of computing the resistance value of the AC motor. Also, by using wide-bandgap semiconductors, it is possible to make the switching elements more compact. By using more compact switching elements, it becomes possible to make a semiconductor module with embedded switching elements more compact.

Since wide-bandgap semiconductors also have high heat resistance, it is possible to make the radiating fins of a heatsink more compact, or use an air cooler instead of a water chiller, thereby enabling the semiconductor module to be even more compact. Furthermore, since the power loss is low, higher efficiency in the switching elements becomes possible, and thus higher efficiency of the semiconductor module becomes possible.

The AC motor may be an induction motor or a rotary motor. A configuration using a linear induction motor, a linear synchronous motor, a solenoid, or the like instead of an AC motor is also possible.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure may be suitably implemented in a control device that controls the conversion of power for driving a motor, and computes a resistance value of the motor.

REFERENCE SIGNS LIST 1, 1F, 1G, 1H, 1J, 1K control device
2, 2F controller
3 dq/three-phase converter
4, 4F, 4G power converter
5 AC motor
6a, 6b, 6c current detector
7 three-phase/dq converter
8, 8A, 8B, 8C, 8D, 8E, 8K resistance calculation activator
9, 9A resistance calculator
10, 10A corrector
11 phase controller
12 velocity calculator
13 storage device
81 OFF delay
82 velocity determiner
83, 83A, 83B, 83C, 83D, 83E first AND gate
84 ON delay
85 second AND gate
86 resistance calculation signal generator
87 pressure determiner
88 latch circuit
89 NOT gate
90 third AND gate
91 velocity calculation signal generator

The invention claimed is:

1. A control device for an electric car comprising:
a power converter that drives an AC motor that produces driving force for a vehicle;
a controller that outputs a voltage command value that is a command value of a voltage that the power converter outputs;
a current detector that detects a current value that the power converter supplies to the AC motor; and
a resistance calculator that computes a resistance value of the AC motor on a basis of the voltage command value and the current value, wherein
in a period in which the resistance calculator computes a resistance value of the AC motor, the controller outputs the voltage command value such that an amplitude of the current value that the power converter supplies to the AC motor becomes a current value that is larger than the amplitude of a rated exciting current of the AC motor.

2. A control device for an electric car comprising:
a power converter that drives an AC motor that produces driving force for a vehicle;
a controller that outputs a voltage command value that is a command value of a voltage that the power converter outputs;
a current detector that detects a current value that the power converter supplies to the AC motor; and
a resistance calculator that computes a resistance value of the AC motor on a basis of the voltage command value and the current value, wherein
in a period in which the resistance calculator computes a resistance value of the AC motor, the power converter operates at a carrier frequency that is lower than the carrier frequency used when the AC motor is revolving.

* * * * *